United States Patent
Ross

(10) Patent No.: US 9,118,852 B2
(45) Date of Patent: *Aug. 25, 2015

(54) ADAPTIVE GAIN CONTROL IMAGE PROCESSING SYSTEM AND METHOD

(71) Applicant: Exelis Inc., McLean, VA (US)

(72) Inventor: Charles Cleveland Ross, San Diego, CA (US)

(73) Assignee: Exelis Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,509

(22) Filed: May 5, 2014

(65) Prior Publication Data

US 2014/0240561 A1 Aug. 28, 2014

Related U.S. Application Data

(63) Continuation of application No. 13/011,204, filed on Jan. 21, 2011, now Pat. No. 8,760,538.

(51) Int. Cl.
| | |
|---|---|
| *H04N 5/217* | (2011.01) |
| *G06K 9/38* | (2006.01) |
| *G06T 5/40* | (2006.01) |
| *H04N 5/357* | (2011.01) |
| *H04N 5/235* | (2006.01) |

(52) U.S. Cl.
CPC ............. *H04N 5/357* (2013.01); *H04N 5/2352* (2013.01)

(58) Field of Classification Search
CPC ......... H04N 5/357; H04N 5/217; G06K 9/38; G06T 5/40

USPC ........................................... 348/241; 382/168
See application file for complete search history.

(56) References Cited

U.S. PATENT DOCUMENTS

| | | | | |
|---|---|---|---|---|
| 5,959,668 | A * | 9/1999 | Cryder et al. | 348/229.1 |
| 6,900,840 | B1 * | 5/2005 | Schinner et al. | 348/333.01 |
| 7,136,095 | B2 * | 11/2006 | Patej | 348/216.1 |
| 7,492,411 | B2 * | 2/2009 | Classen et al. | 348/362 |
| 2003/0193571 | A1 * | 10/2003 | Schultz et al. | 348/207.99 |
| 2003/0234870 | A1 * | 12/2003 | Ostromek et al. | 348/217.1 |
| 2006/0217913 | A1 * | 9/2006 | Kaushikkar et al. | 702/107 |
| 2008/0157000 | A1 * | 7/2008 | Shamir et al. | 250/473.1 |
| 2008/0180554 | A1 * | 7/2008 | Kobayashi et al. | 348/246 |
| 2008/0187178 | A1 * | 8/2008 | Shamaie | 382/103 |
| 2010/0007795 | A1 * | 1/2010 | Ouyang et al. | 348/572 |

* cited by examiner

*Primary Examiner* — Sinh Tran
*Assistant Examiner* — Mark Monk
(74) *Attorney, Agent, or Firm* — Davidson Berquist Jackson & Gowdey, LLP

(57) ABSTRACT

By utilizing scene metrics in an image processing system (such as night vision goggles or a camera), a setpoint controller can set a setpoint used by a gain controller. Using the setpoint and an average video level of a frame, the gain controller can set gain control signals sent to an image sensor and/or a high voltage power supply to adaptively adjust for higher and lower light scenarios. Scene metrics can include an amount of saturation in a frame, a number or percentage of pixels above a first threshold and a number or percentage of pixels below a second threshold.

25 Claims, 11 Drawing Sheets
(1 of 11 Drawing Sheet(s) Filed in Color)

ADAPTIVE GAIN CONTROL IMAGE PROCESSING SYSTEM AND METHOD

CROSS-REFERENCE TO CO-PENDING APPLICATION

This application is a continuation of co-pending U.S. application Ser. No. 13/011,204, filed Jan. 21, 2011, the contents of which are incorporated herein by reference.

FIELD OF INVENTION

The present invention is directed to a system and method for adaptive gain control in an image processing environment, and, in one embodiment, to a system and method for preferentially controlling saturation and/or other image characteristics in an image processing environment (e.g., in a night vision goggle system).

DISCUSSION OF THE BACKGROUND

Known histogram-based adaptive gain control (AGC) systems are based on the maximum amplitude histogram bin to control the output video level or use other histogram weighting functions such as using the bin with the greatest number of pixels exceeding a preset maximum for that bin. Those applications have been used in non-intensified cameras based on conventional CCD or CMOS image sensors.

However, such algorithms can suffer performance issues when there is a bimodal distribution of pixel values in the histogram such that the preponderance of pixels are either very dark or very bright with fewer mid-level gray values between, such as might occur when imaging a dark horizon with interfering sky glow or in urban environments. Under such conditions, imagery from known AGC system can have excessive saturation (clipping) of bright scene content, as compared to a scene with no excess dark scene content. In an intensified camera, this leads to shortened tube lifetime, reduced intra-scene dynamic range, and loss of useful scene content near bright sources.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following description, given with respect to the attached drawings, may be better understood with reference to the non-limiting examples of the drawings, wherein.

DISCUSSION OF THE PREFERRED EMBODIMENTS

Figure 1:
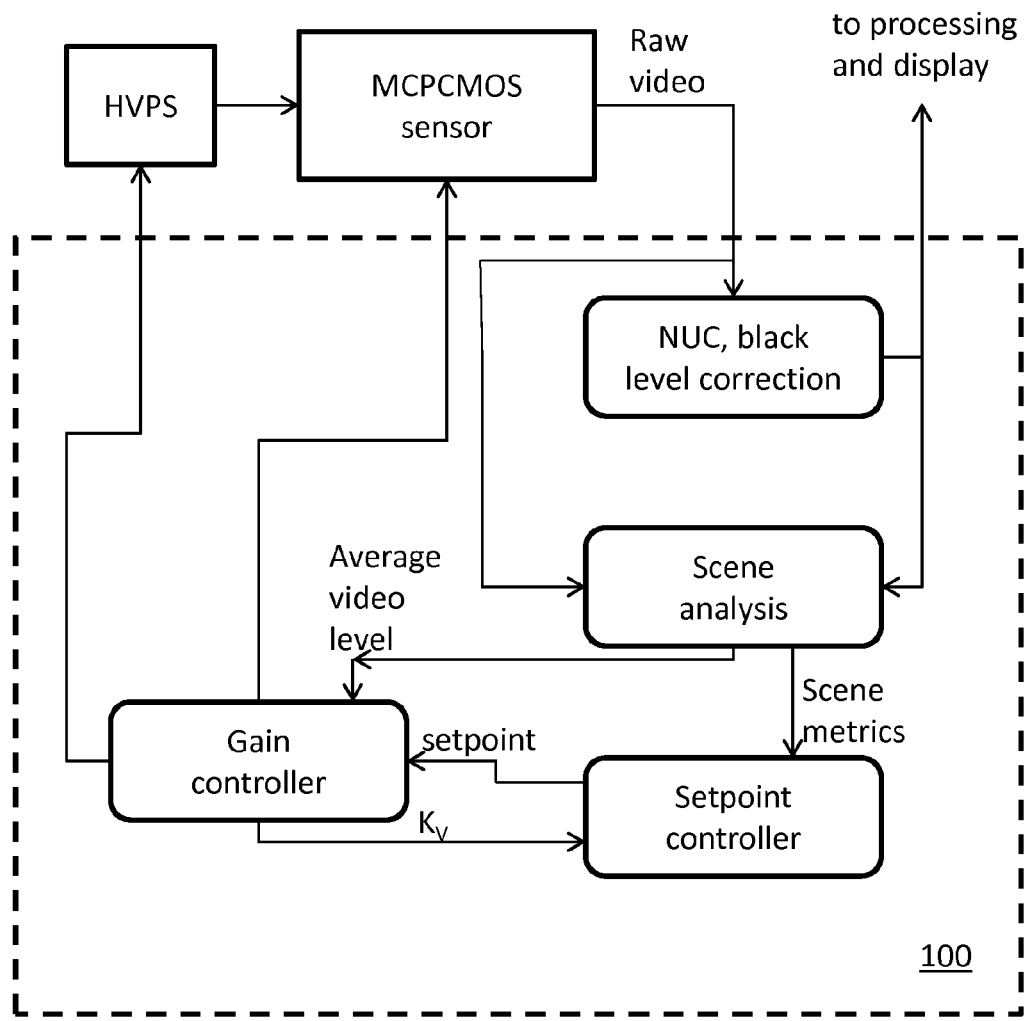
FIG. 1 is block diagram of a portion of an imaging system.

Turning to FIG. 1, a simplified block diagram of a portion of an imaging system is shown. Although not shown, one of ordinary skill in the art will understand that the imaging system may also include other elements, such as lenses and a display device (e.g., a monitor or night-vision goggles). As shown, at least one image sensor (e.g., an MCPCMOS sensor), operating in conjunction with a variable gain high voltage power supply (HVPS) may provide a stream of raw video (e.g., frame-by-frame) to video processing circuitry 100 (which includes enhanced automatic gain control (AGC) circuitry). The image sensor and HVPS each include at least one gain input for receiving gain control information from the video processing circuitry 100.

The gain control information is generated within gain controller circuitry of the video processing circuitry 100, and the gain control information is calculated, at least in part, by information supplied by scene analysis circuitry and setpoint controller circuitry. In one embodiment, the scene analysis circuitry calculates and outputs to the gain controller circuitry an average video level of a frame of raw and/or preprocessed image data. (The raw image data may be preprocessed by non-uniform correction (NUC) circuitry and/or black level correction circuitry before being applied to the scene analysis circuitry.) The scene analysis circuitry also outputs scene metrics (described in greater detail below) to the setpoint controller circuitry which in turn outputs a setpoint to the gain controller circuitry. The system may be implemented with a combination of an FPGA, a microcontroller (e.g., a microprocessor (either embedded or general-purpose)) (and its corresponding computer memory for storing program code and data) and/or other required supporting electronics. In one such embodiment, the video metrics (e.g., saturation, high bin, low bin, and average video level) are acquired from the image sensor at pixel rate by the FPGA and made available to the microcontroller, in terms of pixel counts, in registers at the end of each active frame. The setpoint calculations are then done in the microcontroller since it is better suited to the implementation of complex calculations only once per frame than an FPGA. The microcontroller writes the updated setpoint to the FPGA where it is used by the system gain control firmware in the FPGA to control the digital video image sensor such that the average video level converges to the new setpoint. Other implementations are possible, including control of an analog video sensor by the addition of an A/D converter or other electronics to gather the image metrics in digital form and provide feedback control to the sensor, and by implementation of all the required calculations into one or more of microcontroller, FPGA or ASIC.

As describe above, the scene analysis circuitry receives at least one frame of image data from an image sensor and/or at least one frame of pre-processed image data from NUC and black level correction circuitry. The scene analysis then generates a histogram pixel-by-pixel for each of the possible intensity values that the image data can take when calculating the scene metrics. Each image data value is associated with a "bin" which is a holder for the count of the number of pixels having the value(s) associated with that bin. For example, for a 12-bit A/D (analog-to-digital) converter, 4096 different possible values can be used to represent an intensity of a particular pixel. (It is also possible to use other A/D converters with a different number of bits per sample.) However, to reduce processing time, a bin can be associated with more than one particular pixel value. For example, the values 0 and 1 could be associated with a first bin, the values 2 and 3 associated with a second bin, etc. up to the values 4094 and 4096 being associated with a $2048^{th}$ bin. Alternatively, each possible pixel value could be associated with its own separate bin, such that there are 4096 bins when using a 12-bit A/D converter.

Figure 2:
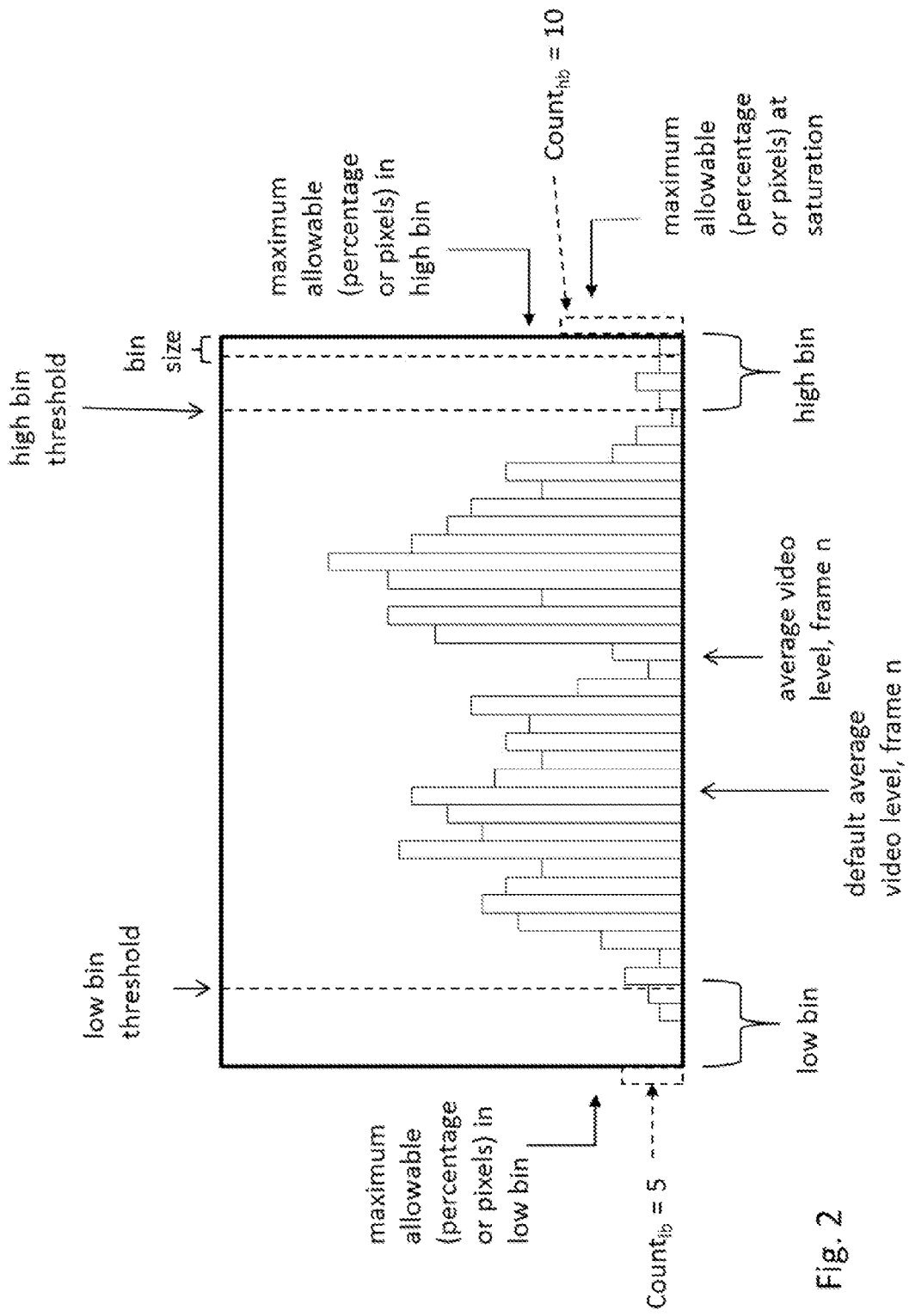
FIG. 2 is an exemplary histogram of the occurrences of different intensities in a frame fed to the sub-assembly of FIG. 1.

As shown in FIG. 2, a greatly simplified number of bins are shown for a frame of image data to be processed by the scene analysis circuitry. The scene analysis circuitry calculates an average video level, a saturation level and two other scene metrics. The average video level is calculated by taking the average of all the intensity values in the current frame, and the saturation level is calculated as the number of pixels in a frame that have a maximum value or are at a saturation point (e.g., have an intensity value of $2^n-1$ out of a possible $2^n-1$). The two other scene metrics are calculated utilizing at least two thresholds. Those thresholds include at least a low bin threshold and a high bin threshold. The low bin threshold is a value below which the scene analysis circuitry treats pixels having an intensity less than the low bin threshold as belonging to the "low bin." Similarly, the high bin threshold is a value above which the scene analysis circuitry treats pixels having an intensity higher than the high bin threshold as belonging to the "high bin." In the exemplary histogram of FIG. 2, there are four bins that have values lower than the low bin threshold, and there are 0, 0, 2 and 3 pixels in each of those bins, respectively. Thus, there are 5 pixels in the low bin (count$_{lb}$=5). Four bins are also illustrated as being above the high bin threshold, and there are 2, 4, 2 and 2 pixels in each of those bins, respectively, with the last two pixels being associated with the "saturated" or maximum level (count$_{sat}$=2). Thus, there are 10 pixels in the "high bin" (count$_{hb}$=10). The scene analysis circuitry then outputs (1) the calculated average video level to the gain controller circuitry and (2) the values of count$_{lb}$, count$_{hb}$ and count$_{sat}$ to the setpoint controller. In an alternate embodiment, rather than the scene analysis circuitry outputting an absolute number of pixels (count$_{lb}$, count$_{hb}$ and count$_{sat}$), the scene analysis circuitry may instead output percentages of pixels that have the corresponding characteristic. Assuming a total of about 475 pixels in the example of FIG. 2, the scene analysis circuitry could instead output percentage$_{lb}$, percentage$_{hb}$ and percentage$_{sat}$ having values of percentage$_{lb}$=(5/475), percentage$_{hb}$=(10/475) and percentage$_{sat}$=(2/475), respectively, in either floating point or integer formats.

In one embodiment, the gain controller circuitry utilizes models of system gain control elements to set gain parameters. In such an embodiment, the output video level is controlled by adjusting individual gain control values based on the expected response of each of the gain control elements in the image sensor and the HVPS. Other possible gain control methods and circuitry that can be controlled by a setpoint can be used as well, such as PID controllers and variants thereof.

Gain corrections are made by the gain controller circuitry periodically (e.g., once per frame), based on the radiometric term $$K_v = \frac{\text{setpoint}}{\text{average video level}}$$

Scaling the current system gain by $K_v$ such that $$\text{Gain}^{n+1} = K_v * \text{Gain}^n$$

would correct the output video level to the setpoint were it not for image sensor transport delays and HVPS bandwidth limitations. To prevent overshoot and uncontrolled gain oscillations, these delays are addressed by changing the gain of the individual system gain control elements on each frame only a predetermined fraction alpha$_v$ of that required for full correction by using a low-pass filter given by $$\text{Gain}^{n+1} = \text{Gain}^n * [\text{alpha}_v * K_v + (1-\text{alpha}_v)]$$

which then converges to the objective $K_v=1.0$ in a controlled manner. To accommodate the differing time response characteristics of gain elements, the gain coefficient term alpha$_v$ is unique for each gain element, having been determined for the best transient response.

As used herein, the term $K_v$ will also be referred to as the "outer control loop" parameter.

The video setpoint is adjusted by the setpoint controller circuitry based on the scene metrics calculated by and received from the scene analysis controller (as described above). The setpoint controller sets the setpoint in order to prioritize a number of objectives. Those objectives include:
 1. Saturation less than a saturation threshold
 2. high bin scene content less than a high bin threshold
 3. low bin scene content less than a low bin threshold
 4. mean video level equal to a predefined nominal Each of the objectives may be configured to have a preferred value; these values control the setpoint response to varying scene content and the resulting histogram. These values would typically be set to maximize the number of pixels that are in the central bins of the histogram, those being neither at full white nor at full black. For low contrast scenes, a predefined setpoint in the mid-gray region, 40% to 60%, for example, may be used to set exposure with minimal or no clipping of the ends of the histogram. At the predefined mid-gray setpoint, however, the resultant imagery of higher contrast scenes may be less than desirable, with clipping at either or both ends of the histogram, and scenes having a wide dynamic range, that being in excess of the dynamic range of the sensor, require a setpoint that is a compromise between too much gain and too little. The high and low bin widths and their respective thresholds are set to constrain the histogram to the central bins, subject to the priorities previously described. The range of the high bin width, 85% to 100% of full white for example, and its associated threshold, 10% for example, work to limit clipping at the right end of the histogram by lowering the setpoint, but are set to values that provide gain stability as well: in scenes with broad areas of similar intensity, the right edge of the histogram will rise steeply towards the left, resulting in a high sensitivity of saturation to average video level. By itself, this high sensitivity could cause gain oscillations if the saturation level changed faster than the system can respond. For stability, the cumulative nature of the width of the high bin and its threshold together are set to provide a lower sensitivity of bin content to average video level than saturation by itself such that the system remains stable. The values required for stability and best transient response will depend upon closed loop gain of the system gain controller, transport delays, and bandwidth of system elements; example values given here have been found to provide stability in the present embodiment. In a manner similar to the high bin, the low bin range is set to include, for example, 0 to 15% of full white, and an associated threshold of, for example, 10%. This works to limit clipping the left end of the histogram by increasing the setpoint. As with the high bin, the low bin width and threshold provide a lower sensitivity of bin content to average video level than would black clipped (zero valued) pixels by itself, such that the system remains stable. It is common to allow a limited amount of saturation in imagery, 3% or less for example, to accommodate bright lights such as the sun or glint during daytime operation or urban lighting at night, in order to still have sufficient gain to see the rest of the scene under most conditions. The saturation threshold serves to reduce system gain to a value that meets that objective.

Figure 4:
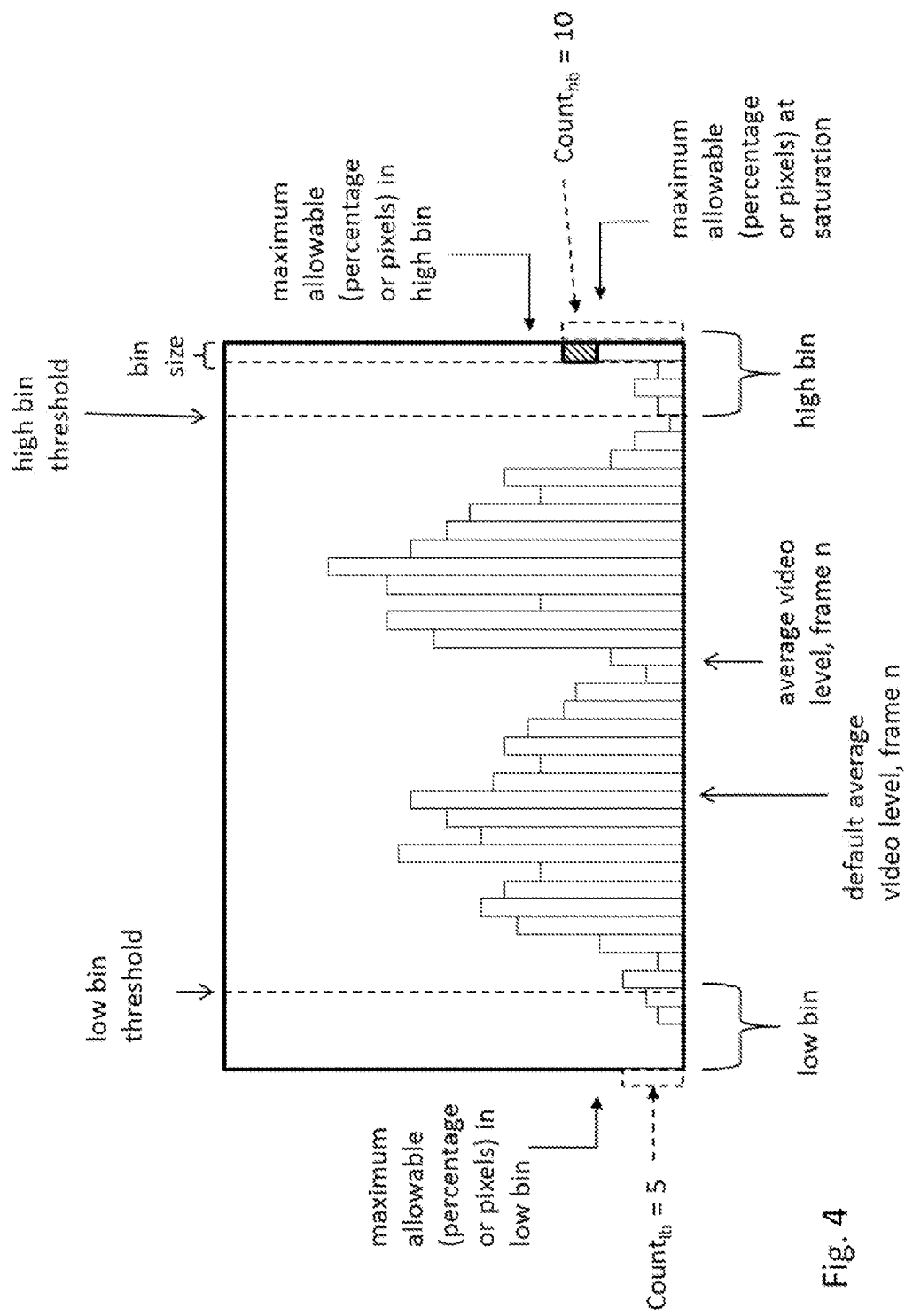
FIG. 4 is an exemplary histogram of the occurrences of different intensities in a frame fed to the sub-assembly of FIG. 1 where the number (or percentage) of saturated pixels requires a reduction in gain.
Figure 5:
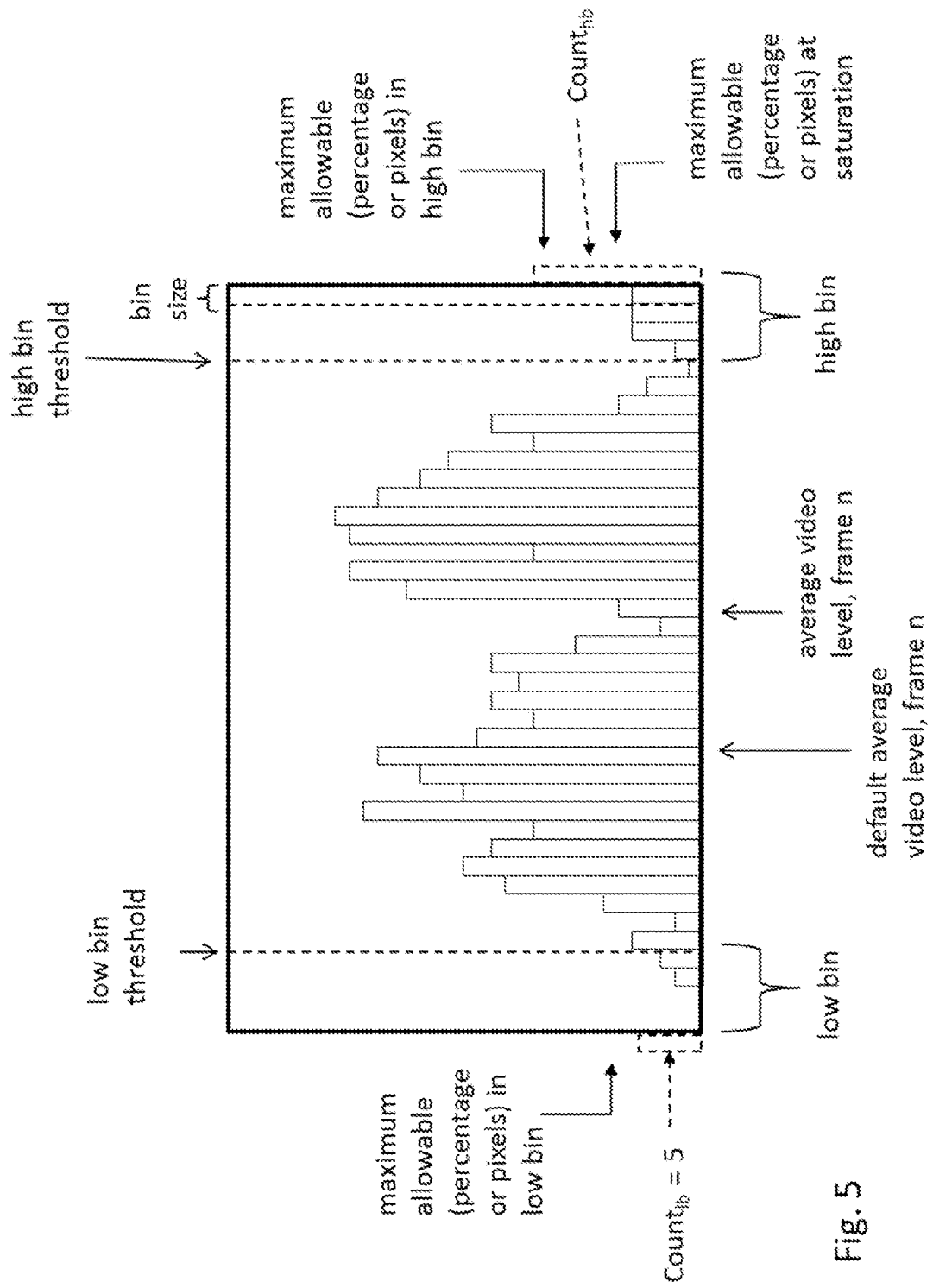
FIG. 5 is an exemplary histogram of the occurrences of different intensities in a frame fed to the sub-assembly of FIG. 1 where the number (or percentage) of pixels in the high bin requires a reduction in gain.

When performing setpoint adjustment, the highest priority objective is gain reduction. The adaptive setpoint is reduced if either the saturation (count$_{sat}$ or percentage$_{sat}$) metric (as shown in FIG. 4) or the high bin metric (count$_{hb}$ or percentage$_{hb}$) exceeds its respective upper limit (as shown in FIG. 5). The smaller of the two objectives is used. Saturation is detected prior to non-uniform correction (NUC) and black level correction, whereas bright and dark scene content is measured on the corrected video as presented to downstream processing.

Figure 6:
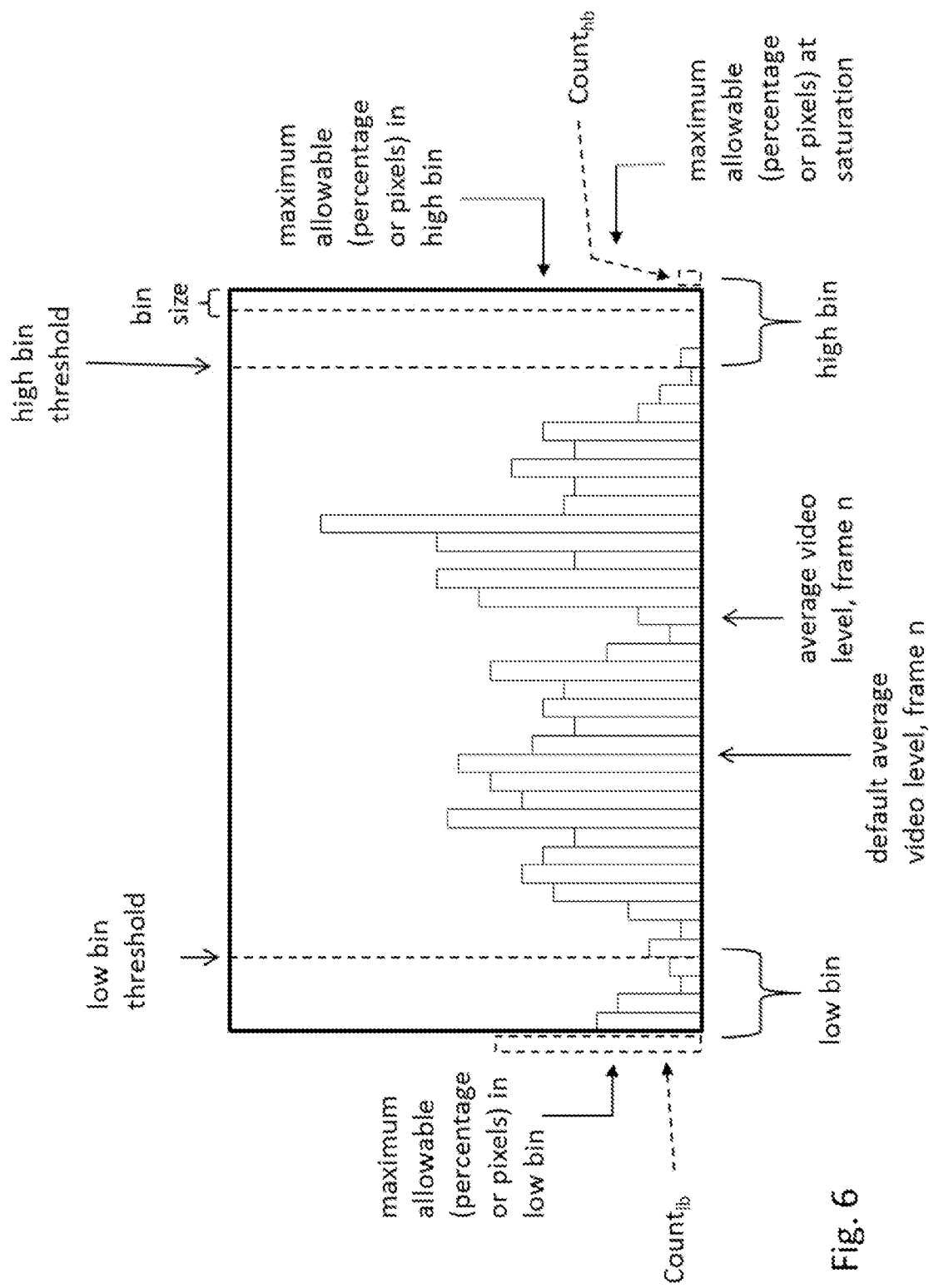
FIG. 6 is an exemplary histogram of the occurrences of different intensities in a frame fed to the sub-assembly of FIG. 1 where the number (or percentage) of pixels in the low bin requires an increase in gain (if possible without violating higher priority objectives)

The next lower priority objective is gain increase. The adaptive setpoint is increased if the low bin metric exceeds its upper limit (as shown in FIG. 6). The sensitivity to the low bin metric is reduced by the onset of saturation and/or high bin scene content, dropping to zero as either increases. The system converges to an equilibrium point where bright scene content prevents and further increase in the adaptive setpoint.

At the lowest priority, the adaptive setpoint moves toward the default setpoint which is a predefined level for low-contrast scenes.

The output of each objective is a gain adjustment to the average video level that would correct the controlling video metric of that objective. Boundary values are excluded in order to allow the prioritized selection logic to adjust the setpoint based on lower priorities as long as higher priority objectives are satisfied. Negative feedback from higher priority objectives to those of lower priority are used to prevent setpoint oscillations between conflicting priorities by reducing lower priority gains at the onset of higher priority terms. The setpoint is then adjusted in proportion to the selected controlling input, forcing an increase or decrease in the average video level in order to control the video metrics of FIG. 2 as determined by the prioritized selection logic.

Figure 3:
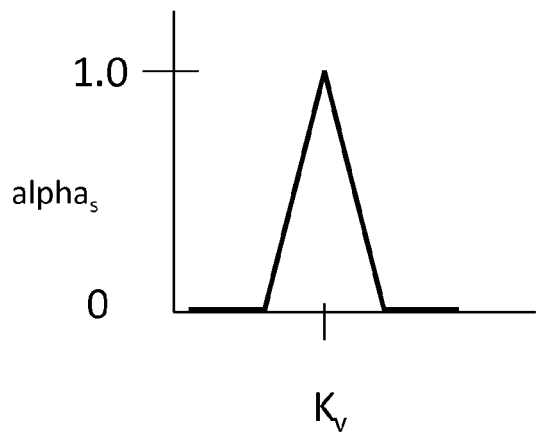
FIG. 3 is a graphical representation of a relationship $K_{vs}$ that sets the slope of $alpha_s$ versus $K_v$.

Gain correction is based on the setpoint to average video ratio ($K_v$). During video transients, adjusting the setpoint would increase the overall loop gain, and the increased gain bandwidth product would lead to overshoot or instability. If, for example, the average video level were suddenly too high, the setpoint method would reduce the setpoint, further increasing the value of $K_v$. For stability, this is prevented by using $K_v$ to calculate a low-pass filter update fraction alpha$_s$ for setpoint adjustment by the equation $$alpha_s = max[0, 1 - K_{vs} * |K_v - 1|] * K_{alpha}$$

where |x| is the absolute value of x, $K_{vs}$ is a scaling constant that sets the slope of alpha$_s$ vs. $K_v$, and $K_{alpha}$ is a system-dependent constant that determines the maximum value of alpha$_s$ as required to ensure system stability (alpha_max<1.0). Graphically, the relationship of alpha$_s$ to $K_v$ is shown in FIG. 3.

The setpoint for frame n+1 is then adjusted according to the low-pass filter equation $$setpoint^{n+1} = setpoint^n * [alpha_s * K_s + (1 - alpha_s)]$$

where $K_s$ is the estimated setpoint needed to correct the video metrics. The result is that the setpoint is adjusted most rapidly when the inner control loop is stable, slows down in proportion to the inner loop gain error, and holds steady during large gain errors.

The corrected image data output from the video processing circuitry may either be output to a display device directly or may be further post-processed before being output to the display device. For example, post processing circuitry may provide contrast enhancement to enable small changes in intensity values to be more readily seen by the human eye.

For video level stability and to avoid overshoot during video transients due to changing scene conditions, the low pass filter must provide appropriate rate control to setpoint adjustment, slowing and stopping setpoint adjustment in proportion to the system gain error. Term alpha$_s$ is a time constant for an alpha filter or other suitable low-pass filter response based on the ratiometric system gain error (the setpoint to average video level ratio) from the system gain controller. The required filter response will depend on the loop response of the system gain controller. The term $K_{alpha}$ sets the maximum bandwidth for the setpoint update low-pass filter. This reduces the overall system gain-bandwidth product for stability by reducing the rate of change in the setpoint during video transients while the system gain controller converges to the setpoint.

Figure 7:
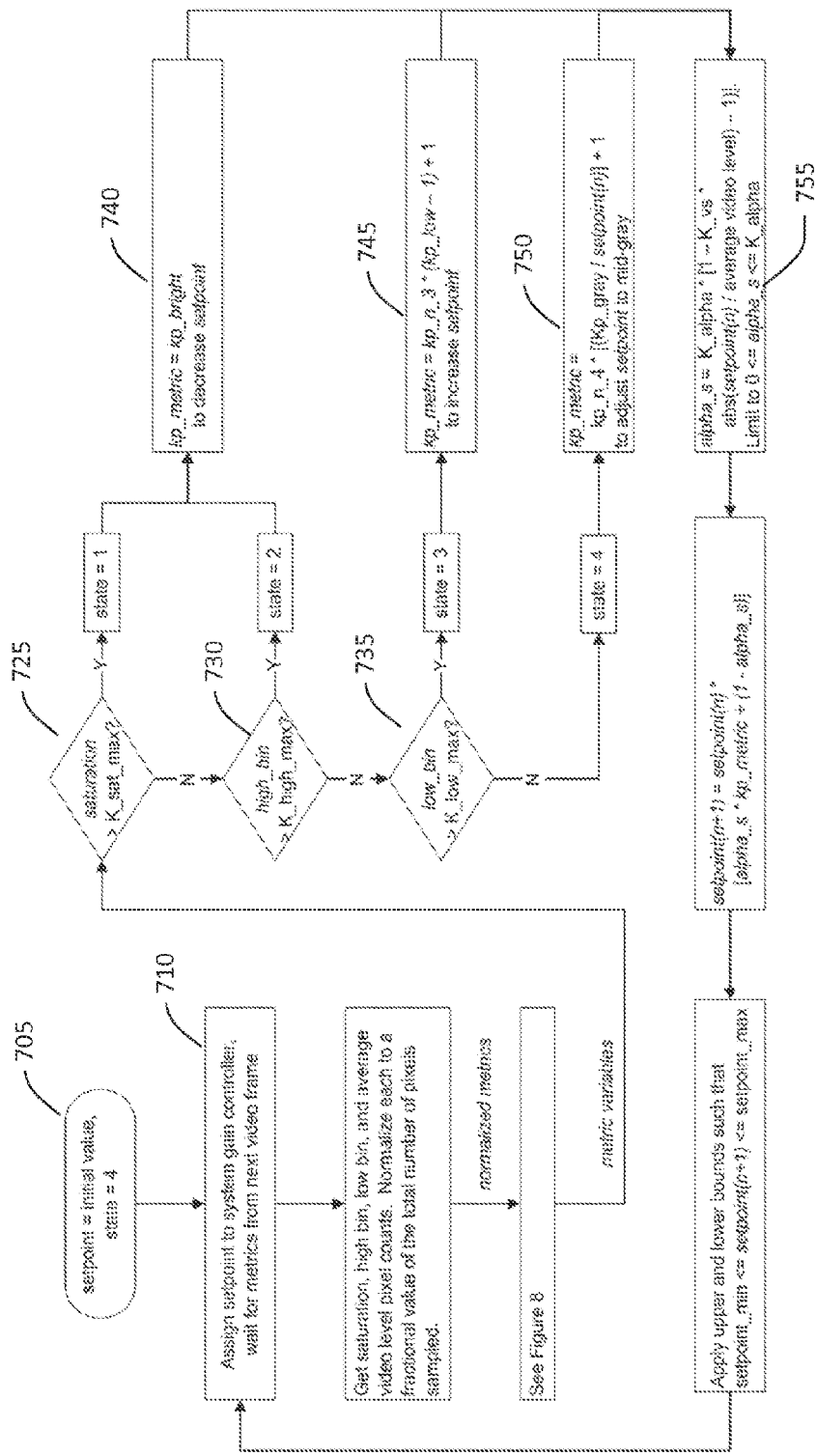
FIG. 7 is a flowchart of a first-level of image processing.
Figure 8:
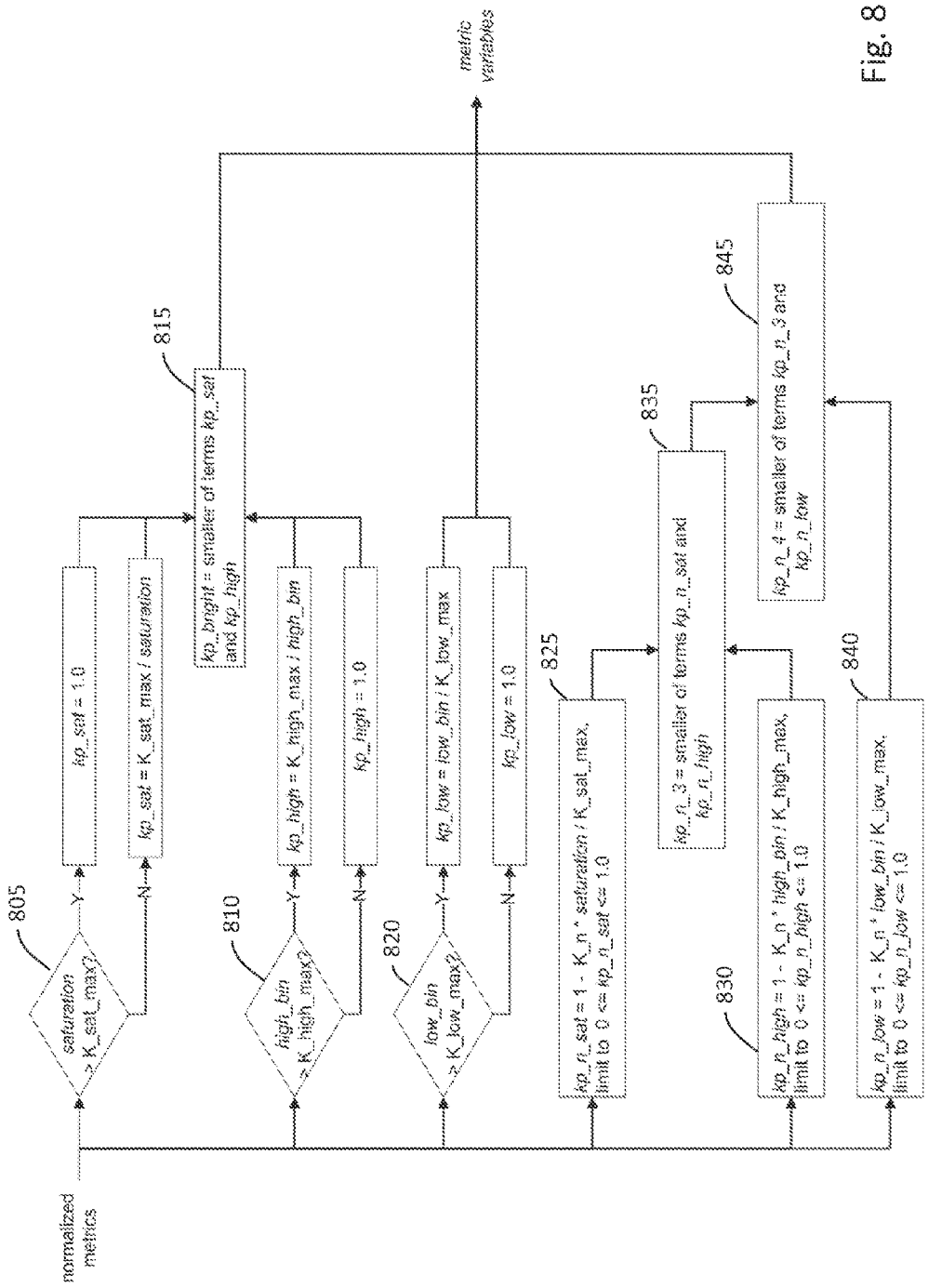
FIG. 8 is a flowchart of a second-level of image processing.

As shown in FIGS. 7 and 8, in one implementation of the adaptive gain control method described herein, the method can be implemented by a series of first- and second-level processing steps. In those figures, lower case italicized terms are variables to be calculated once per frame while constants have an upper case prefix "K_" such as K_sat_max or K_high_max. In addition, the setpoint has been normalized to fall in the range of 0 to 1. (The use of underscores in the flowcharts and their descriptions herein is intended to represent how a computer programmer might name a variable that would be written with subscripts in mathematical notations. For example, K_sat_max would be written in mathematical notation as: $K_{sat_{max}}$.)

Terms "kp_xx" (where "xx" is one of the conditions of the system (e.g., kp_sat, kp_high, kp_low)) establish setpoint gains as needed by each metric when given control by subsequent priority logic. The terms are proportional to the ratio of the metric to its desired maximum or objective. In addition, terms "kp_n_xx" (where "xx" is one of the conditions of the system (e.g., kp_n_sat, kp_n_high, kp_n_low)) are cross-metric feedback terms that scale the gain of lower priority terms kp_xx in subsequent calculations. These terms reduce the setpoint control loop gain of lower priority metrics for stability during transition between controlling priorities. The range of kp_n_xx is limited to a maximum value of 1.0 (no reduction of lower priority gain) when there is no bin content in the higher priority metric, and is limited to a minimum value of zero (for zero net gain of lower priority terms) as the higher priority metric approaches its maximum limit. It is important to note that in order to eliminate setpoint oscillation by competing metrics that the feedback gain, or slope of the kp_n_xx terms must be such that they reach zero prior to the defining metric reaching its maximum limit. This is established by the scalefactor K_n in the kp_n_xx calculations, where K_n>1.0. The value of K_n will depend on the dynamics of the implemented control system.

As shown in FIG. 7, in step 705 a setpoint is assigned an initial value, and the system is placed in an initial state (e.g., state=4). In step 710, the setpoint is then assigned to the gain controller circuitry and the metrics are received for a next frame (which, during initialization, is a first frame). The metrics (e.g., saturation, high bin, low bin and average video level) are then normalized (if they were not received in normalized form), and control passes to the steps of the flowchart of FIG. 8. The steps of FIG. 8 then determine how, if at all, the metric variables should be updated based on the normalized metric values. In step 805, the system determines if the normalized saturation value ("saturation") is above the threshold value K_sat_max for the current frame. If it is, the variable kp_sat is set to 1.0 (or to another maximum value if the metric variables are not normalized on a 0.0 to 1.0 scale). If the system determines that the normalized saturation value is not above the threshold value K_sat_max for the current frame, then the variable kp_sat is set to K_sat_max/saturation. In step 810, the system determines if the normalized high bin value ("high_bin") is above the threshold value K_high_max for the current frame. If it is, the variable kp_high is set to K_high_max/high bin. If the system determines that the normalized high bin value is not above the threshold value K_high_max for the current frame, then the variable kp_high is set to 1.0 (or to another maximum value if the metric variables are not normalized on a 0.0 to 1.0 scale). A similar process is then performed in step 820 to set the variable kp_low. Having performed the steps 805 and 810, the system performs step 815 which sets the variable kp_bright to be the smaller of the kp_sat and kp_high.

The system also sets the cross-metric feedback terms kp_n_ sat, kp_n_high and kp_n_low in steps 825, 830 and 840, respectively. In step 835, the cross-metric feedback terms kp_n__3 is set using the values from steps 825 and 830. In step 845, the cross-metric feedback terms kp_n__4 is set using the values from steps 835 and 840. Control then passes back to step 725 of FIG. 7. In steps 725, 730 and 735, the system determines which state it is in so that changes can be made as necessary in steps 740, 745 and 750. For example, if in step 725 the system determines that "saturation" is greater than the threshold K_sat_max, then the system sets its state to state=1, passes control to step 740 and sets the variable kp_metric (acting as an adjustment metric) to equal kp_bright (which will result in decreasing the setpoint as described later). Similarly, if in step 725 the system determines that "saturation" is not greater than the threshold K_sat_max, then the system passes control to step 730. If in step 730 the system determines that "high_bin" is greater than the threshold K_high_ max, then the system sets its state to state=2, passes control to step 740 and sets the variable kp_metric to equal kp_bright. If in step 730 the system determines that "high_bin" is not greater than the threshold K_high_max, then the system passes control to step 735. If in step 735 the system determines that "low bin" is greater than the threshold K_low_ max, then the system sets its state to state=3, passes control to step 745 and sets the variable kp_metric to equal kp_n__3*(kp_low−1)+1 (which will result in an increase in the setpoint). If the comparison of step 735 is false, then the system sets its state to state=4 (the initial state), passes control to step 750 and sets the variable kp_metric to equal kp_n__4*(Kp_gray/setpoint(n))+1 (which will result in a setpoint for mid-gray values).

After setting the value of kp_metric in step 740, 745 or 750, the system passes control to step 755 which sets the value of alpha_s. The value of alpha_s is then used to set the setpoint (n+1) (i.e., the setpoint for frame (n+1)), after which the system constrains setpoint(n+1) to within upper and lower bounds (10% and 90% of full white, for example) before returning control to step 710 for the next frame.

Figure 9:
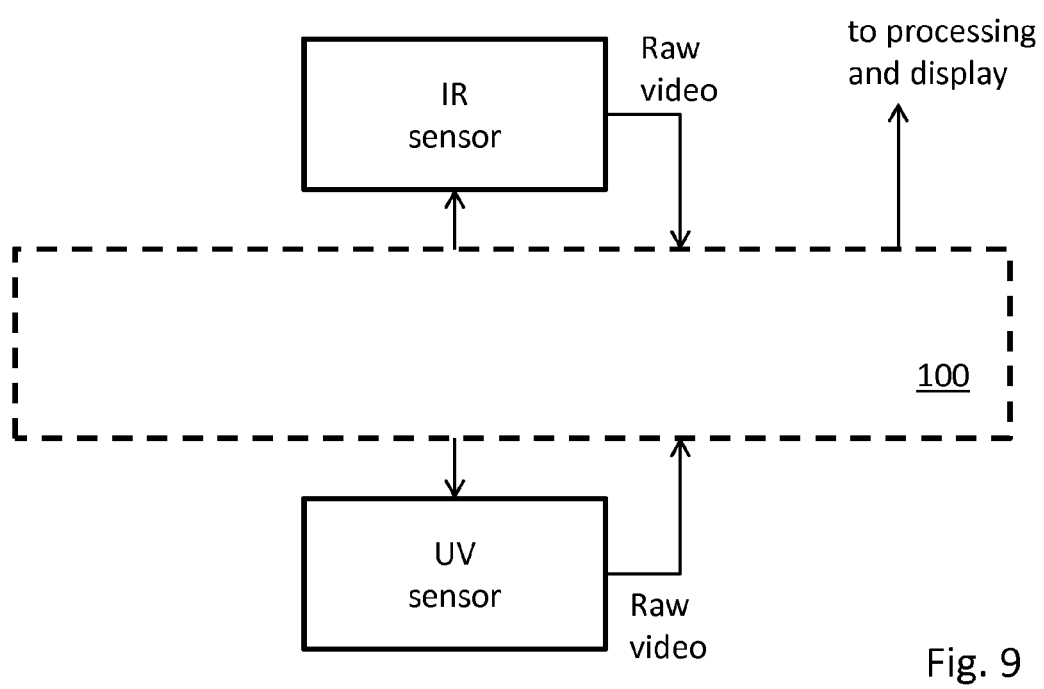
FIG. 9 is a block diagram of a multi-sensor imaging system.

As shown in FIG. 9, an imaging system may utilize plural image sensors (e.g., a UV sensor and an IR sensor), each of which can be controlled by at least one set of video processing circuitry 100. In an embodiment where the same circuitry processes image data from both sensors, the low bin and high bin threshold values may change between image type calculations, as well as the acceptable max saturation. As a result, the gains applied to each sensor may be different.

Figure 10A:
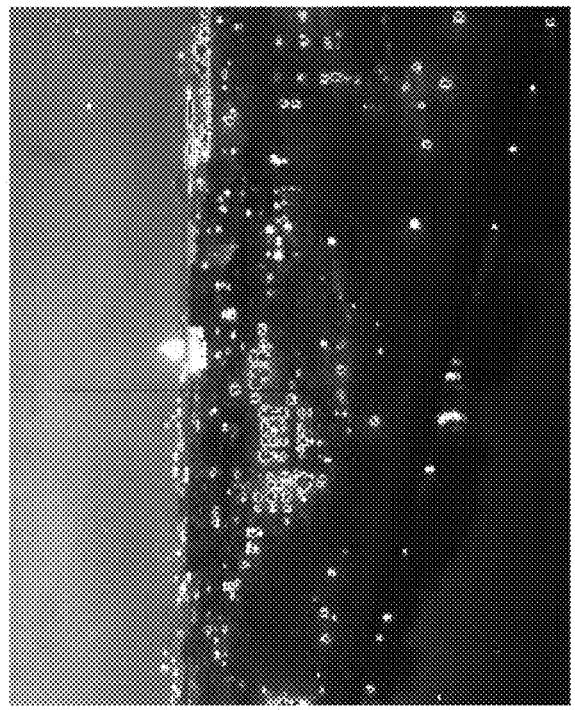
FIG. 10A is a simulated image of a frame of video using a fixed setpoint.
Figure 10B:
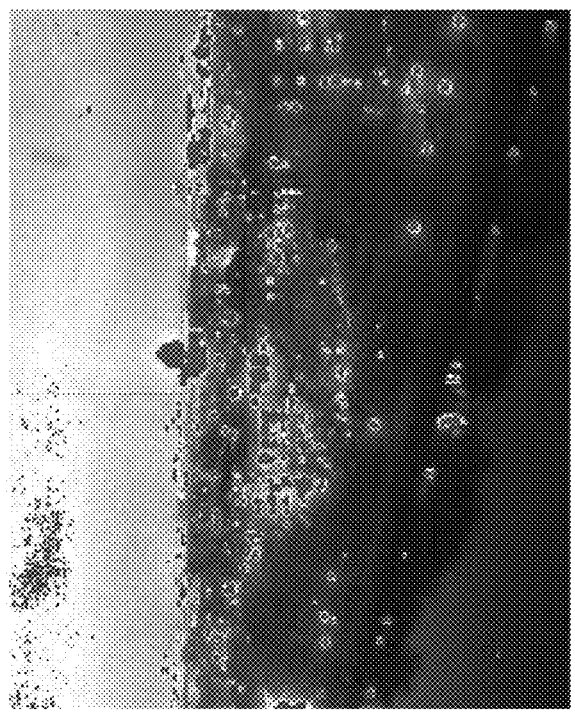
FIG. 10B is a simulated image of a frame of video using an adaptive setpoint

FIGS. 10A and 10B show single frames taken from MATLAB math simulator simulations of video and represent the expected response of a system using a fixed setpoint (FIG. 10A) versus a system using an adaptive setpoint AGC (FIG. 10B) as described herein. Pixels that are saturated are displayed in red (jpeg artifacts make pink). The comparison shows an expected reduction in saturation around areas of urban lighting that would otherwise occur, allowing significantly greater grayscale information in those areas. In application, existing methods of contrast enhancement would then be used to improve the imagery in all areas of the image, in real time, to the extent possible.

Figure 11A:
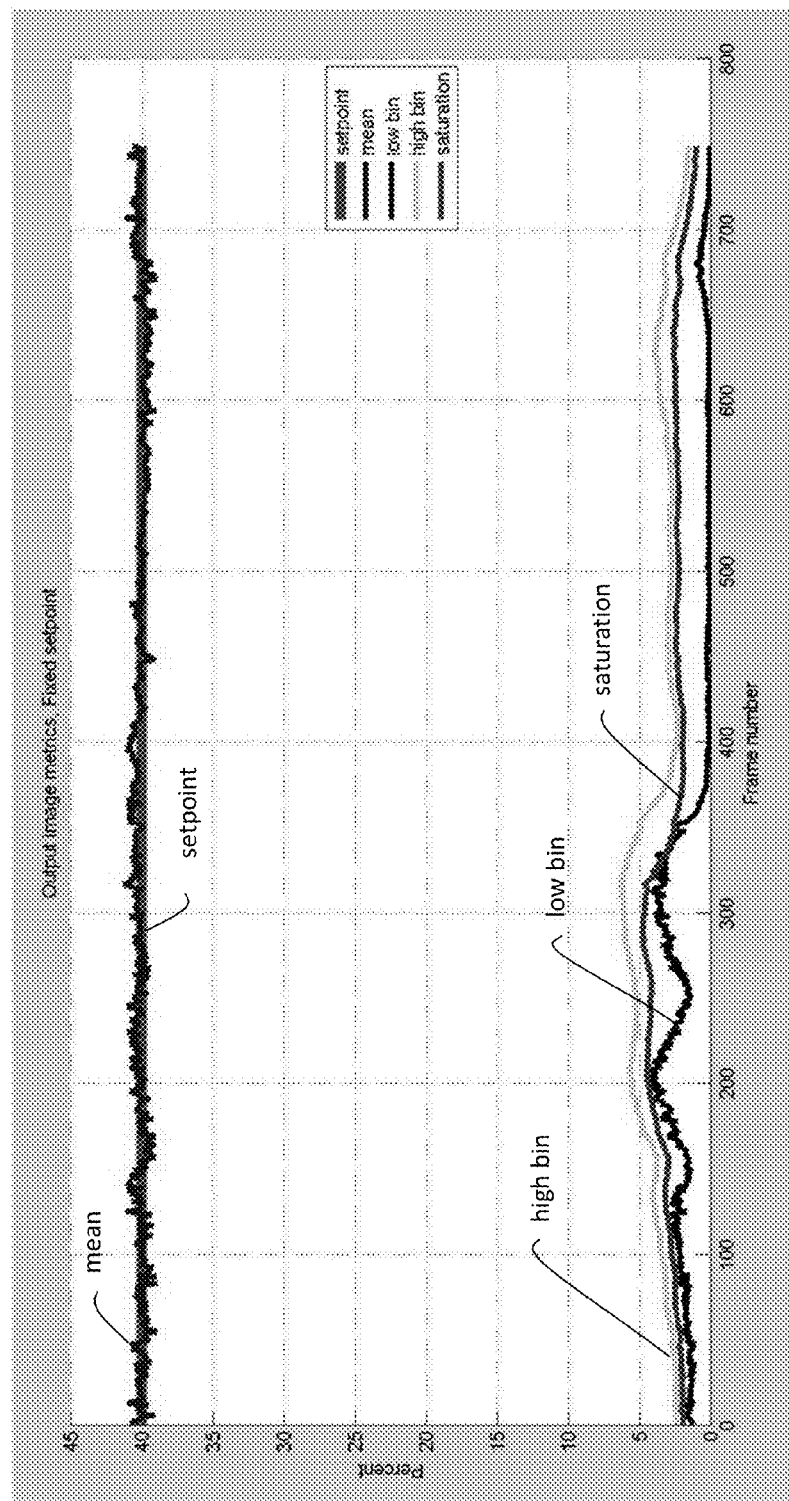
FIG. 11A is a graph showing metric values using a fixed setpoint in a simulation of video processing.
Figure 11B:
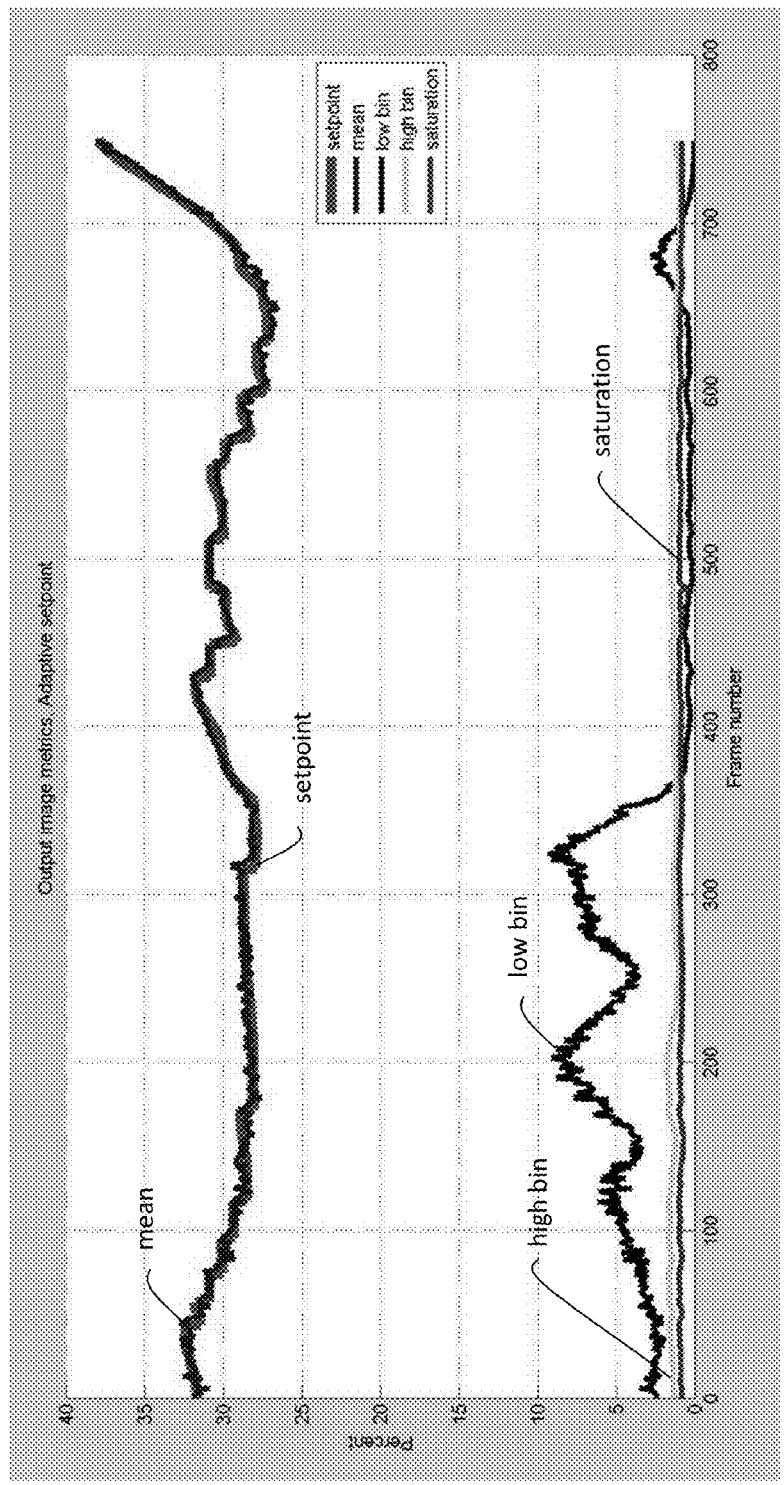
FIG. 11B is a graph showing metric values using an adaptive setpoint in a simulation of video processing.

FIGS. 11A and 11B show output image metrics taken from a MATLAB math simulator simulation of video over about 750 frames of data. As can be seen by comparing FIGS. 11A and 11B, the fixed setpoint of FIG. 11A is expected to experience greater saturation of images than a system using the adaptive setpoint method and system described herein that limits saturation (and other image characteristics) by adapting the setpoint of the method and system. The Appendix included herewith (and which forms a portion of the specification) shows another exemplary run of a simulated system and shows how various metric values change and how the system transitions between various states while performing adaptive control.

The above-described method of performing gain control can be integrated into the design of the image sensor itself for space-constrained applications such as night vision goggles or cameras (including, but not limited to cellphone cameras). The controlling constants as described above can further be modified as needed for application of the method to different sensors, including visible, IR, or other imaging sensors that have widely different spectral and temporal responses. Furthermore, although some values (such as thresholds) have been described as constants (e.g., bin widths, limits, and other constants), those values can themselves be variables to be adjusted based on other parameters or objectives such as user controls, other measurements such as objects detected in the imagery itself, mission objectives, and scene characteristics as determined by other means.

While certain configurations of structures have been illustrated for the purposes of presenting the basic structures of the present invention, one of ordinary skill in the art will appreciate that other variations are possible which would still fall within the scope of the appended claims.

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 1 | 0 | 1 | 1 | 0.504 | 1 | 1 | 2 | 0.9 | 1 |
| 2 | 0 | 1 | 1 | 0.504 | 1 | 1 | 2 | 0.9 | 1 |
| 3 | 0 | 1 | 1 | 0.503 | 1 | 1 | 2 | 0.9 | 1 |
| 4 | 0 | 1 | 1 | 0.505 | 1 | 1 | 1.988 | 0.879 | 1 |
| 5 | 0 | 1 | 1 | 0.293 | 1 | 1 | 1.521 | 0.859 | 1 |
| 6 | 0 | 0 | 1 | 0.165 | 0.397 | 1 | 1.242 | 0.837 | 1 |
| 7 | 0 | 0 | 1 | 0.051 | 0.253 | 1 | 1.111 | 0.815 | 1 |
| 8 | 0 | 0 | 1 | 0.034 | 0.22 | 1 | 1.045 | 0.793 | 1 |
| 9 | 0 | 0 | 1 | 0.029 | 0.209 | 1 | 1.002 | 0.772 | 1 |
| 10 | 0 | 0 | 1 | 0.027 | 0.207 | 1 | 0.971 | 0.751 | 1 |
| 11 | 0 | 0 | 1 | 0.028 | 0.209 | 1 | 0.947 | 0.73 | 1 |
| 12 | 0 | 0 | 1 | 0.03 | 0.214 | 1 | 0.928 | 0.711 | 1 |
| 13 | 0 | 0 | 1 | 0.034 | 0.223 | 1 | 0.913 | 0.691 | 1 |
| 14 | 0 | 0 | 1 | 0.038 | 0.238 | 1 | 0.903 | 0.673 | 1 |
| 15 | 0 | 0 | 1 | 0.047 | 0.259 | 1 | 0.896 | 0.655 | 1 |
| 16 | 0 | 0 | 1 | 0.058 | 0.284 | 1 | 0.891 | 0.637 | 1 |
| 17 | 0 | 0 | 1 | 0.077 | 0.336 | 1 | 0.89 | 0.62 | 1 |
| 18 | 0 | 0 | 1 | 0.107 | 0.391 | 1 | 0.89 | 0.603 | 1 |
| 19 | 0 | 0 | 1 | 0.145 | 0.495 | 1 | 0.892 | 0.587 | 1 |
| 20 | 0 | 0 | 1 | 0.171 | 0.659 | 1 | 0.895 | 0.571 | 1 |
| 21 | 0 | 0 | 1 | 0.19 | 0.895 | 1 | 0.897 | 0.556 | 1 |
| 22 | 0 | 1 | 1 | 0.206 | 1 | 1 | 0.899 | 0.541 | 1 |
| 23 | 0 | 1 | 1 | 0.219 | 1 | 1 | 0.9 | 0.527 | 1 |
| 24 | 0 | 1 | 1 | 0.233 | 1 | 1 | 0.901 | 0.513 | 1 |
| 25 | 0 | 1 | 1 | 0.245 | 1 | 1 | 0.902 | 0.499 | 1 |
| 26 | 0 | 1 | 1 | 0.258 | 1 | 1 | 0.903 | 0.485 | 1 |
| 27 | 0 | 1 | 1 | 0.271 | 1 | 1 | 0.903 | 0.472 | 1 |
| 28 | 0 | 1 | 1 | 0.287 | 1 | 1 | 0.904 | 0.46 | 1 |
| 29 | 0 | 1 | 1 | 0.304 | 1 | 1 | 0.904 | 0.447 | 1 |
| 30 | 0 | 1 | 1 | 0.32 | 1 | 1 | 0.904 | 0.435 | 1 |
| 31 | 0 | 1 | 1 | 0.339 | 1 | 1 | 0.904 | 0.424 | 1 |
| 32 | 0 | 1 | 1 | 0.363 | 1 | 1 | 0.905 | 0.412 | 1 |
| 33 | 0 | 1 | 1 | 0.392 | 1 | 1 | 0.905 | 0.401 | 1 |
| 34 | 0 | 1 | 1 | 0.418 | 1 | 1 | 0.905 | 0.39 | 1 |
| 35 | 0 | 1 | 1 | 0.443 | 1 | 1 | 0.905 | 0.38 | 1 |
| 36 | 0 | 1 | 1 | 0.464 | 1 | 1 | 0.905 | 0.37 | 1 |
| 37 | 0 | 1 | 1 | 0.493 | 1 | 1 | 0.906 | 0.36 | 1 |
| 38 | 0 | 1 | 1 | 0.523 | 1 | 1 | 0.906 | 0.35 | 1 |
| 39 | 0 | 1 | 1 | 0.566 | 1 | 1 | 0.906 | 0.341 | 1 |
| 40 | 0 | 1 | 1 | 0.609 | 1 | 1 | 0.906 | 0.331 | 1 |
| 41 | 0 | 1 | 1 | 0.669 | 1 | 1 | 0.906 | 0.323 | 1 |
| 42 | 0 | 1 | 1 | 0.728 | 1 | 1 | 0.906 | 0.314 | 1 |
| 43 | 0 | 1 | 1 | 0.824 | 1 | 1 | 0.907 | 0.305 | 1 |
| 44 | 1 | 1 | 1 | 1 | 1 | 1 | 0.932 | 0.305 | 4 |
| 45 | 1 | 1 | 1 | 1 | 1 | 1 | 0.954 | 0.305 | 4 |
| 46 | 1 | 1 | 1 | 1 | 1 | 1 | 0.971 | 0.305 | 4 |
| 47 | 1 | 1 | 0 | 1 | 1 | 1.124 | 0.982 | 0.306 | 3 |
| 48 | 1 | 1 | 0 | 1 | 1 | 1.138 | 0.989 | 0.306 | 3 |
| 49 | 1 | 1 | 0 | 1 | 1 | 1.141 | 0.994 | 0.306 | 3 |
| 50 | 1 | 1 | 0 | 1 | 1 | 1.159 | 0.997 | 0.306 | 3 |
| 51 | 1 | 1 | 0 | 1 | 1 | 1.148 | 0.999 | 0.306 | 3 |
| 52 | 1 | 1 | 0 | 1 | 1 | 1.161 | 1 | 0.306 | 3 |
| 53 | 1 | 1 | 0 | 1 | 1 | 1.163 | 1.001 | 0.307 | 3 |
| 54 | 1 | 1 | 0 | 1 | 1 | 1.155 | 1.001 | 0.307 | 3 |
| 55 | 1 | 1 | 0 | 1 | 1 | 1.153 | 1.001 | 0.307 | 3 |
| 56 | 1 | 1 | 0 | 1 | 1 | 1.155 | 1.002 | 0.307 | 3 |
| 57 | 1 | 1 | 0 | 1 | 1 | 1.159 | 1.002 | 0.307 | 3 |
| 58 | 1 | 1 | 0 | 1 | 1 | 1.152 | 1.002 | 0.307 | 3 |
| 59 | 1 | 1 | 0 | 1 | 1 | 1.16 | 1.002 | 0.308 | 3 |
| 60 | 1 | 1 | 0 | 1 | 1 | 1.155 | 1.002 | 0.308 | 3 |
| 61 | 1 | 1 | 0 | 1 | 1 | 1.158 | 1.002 | 0.308 | 3 |
| 62 | 1 | 1 | 0 | 1 | 1 | 1.144 | 1.002 | 0.308 | 3 |
| 63 | 1 | 1 | 0 | 1 | 1 | 1.147 | 1.002 | 0.308 | 3 |
| 64 | 1 | 1 | 0 | 1 | 1 | 1.142 | 1.002 | 0.308 | 3 |
| 65 | 1 | 1 | 0 | 1 | 1 | 1.148 | 1.002 | 0.308 | 3 |
| 66 | 1 | 1 | 0 | 1 | 1 | 1.143 | 1.002 | 0.309 | 3 |
| 67 | 1 | 1 | 0 | 1 | 1 | 1.152 | 1.002 | 0.309 | 3 |
| 68 | 1 | 1 | 0 | 1 | 1 | 1.142 | 1.002 | 0.309 | 3 |
| 69 | 1 | 1 | 0 | 1 | 1 | 1.142 | 1.002 | 0.309 | 3 |
| 70 | 1 | 1 | 0 | 1 | 1 | 1.141 | 1.002 | 0.309 | 3 |
| 71 | 1 | 1 | 0 | 1 | 1 | 1.141 | 1.002 | 0.309 | 3 |
| 72 | 1 | 1 | 0 | 1 | 1 | 1.133 | 1.002 | 0.31 | 3 |
| 73 | 1 | 1 | 0 | 1 | 1 | 1.136 | 1.002 | 0.31 | 3 |
| 74 | 1 | 1 | 0 | 1 | 1 | 1.136 | 1.002 | 0.31 | 3 |
| 75 | 1 | 1 | 0 | 1 | 1 | 1.123 | 1.002 | 0.31 | 3 |
| 76 | 1 | 1 | 0 | 1 | 1 | 1.142 | 1.002 | 0.31 | 3 |
| 77 | 1 | 1 | 0 | 1 | 1 | 1.14 | 1.001 | 0.31 | 3 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 78 | 1 | 1 | 0 | 1 | 1 | 1.137 | 1.001 | 0.31 | 3 |
| 79 | 1 | 1 | 0 | 1 | 1 | 1.129 | 1.001 | 0.31 | 3 |
| 80 | 1 | 1 | 0 | 1 | 1 | 1.124 | 1.001 | 0.311 | 3 |
| 81 | 1 | 1 | 0 | 1 | 1 | 1.123 | 1.001 | 0.311 | 3 |
| 82 | 1 | 1 | 0 | 1 | 1 | 1.129 | 1.001 | 0.311 | 3 |
| 83 | 1 | 1 | 0 | 1 | 1 | 1.123 | 1.001 | 0.311 | 3 |
| 84 | 1 | 1 | 0 | 1 | 1 | 1.124 | 1.001 | 0.311 | 3 |
| 85 | 1 | 1 | 0 | 1 | 1 | 1.124 | 1.001 | 0.311 | 3 |
| 86 | 1 | 1 | 0 | 1 | 1 | 1.13 | 1.001 | 0.311 | 3 |
| 87 | 1 | 1 | 0 | 1 | 1 | 1.121 | 1.001 | 0.311 | 3 |
| 88 | 1 | 1 | 0 | 1 | 1 | 1.126 | 1.001 | 0.311 | 3 |
| 89 | 1 | 1 | 0 | 1 | 1 | 1.122 | 1.001 | 0.312 | 3 |
| 90 | 1 | 1 | 0 | 1 | 1 | 1.124 | 1.001 | 0.312 | 3 |
| 91 | 1 | 1 | 0 | 1 | 1 | 1.121 | 1.001 | 0.312 | 3 |
| 92 | 1 | 1 | 0 | 1 | 1 | 1.115 | 1.001 | 0.312 | 3 |
| 93 | 1 | 1 | 0 | 1 | 1 | 1.113 | 1.001 | 0.312 | 3 |
| 94 | 1 | 1 | 0 | 1 | 1 | 1.116 | 1.001 | 0.312 | 3 |
| 95 | 1 | 1 | 0 | 1 | 1 | 1.112 | 1.001 | 0.312 | 3 |
| 96 | 1 | 1 | 1 | 1 | 1 | 1 | 1.001 | 0.312 | 4 |
| 97 | 1 | 1 | 0 | 1 | 1 | 1.114 | 1.001 | 0.312 | 3 |
| 98 | 1 | 1 | 0 | 1 | 1 | 1.112 | 1.001 | 0.312 | 3 |
| 99 | 1 | 1 | 0 | 1 | 1 | 1.112 | 1.001 | 0.312 | 3 |
| 100 | 1 | 1 | 1 | 1 | 1 | 1 | 1.001 | 0.312 | 4 |
| 101 | 1 | 1 | 0 | 1 | 1 | 1.116 | 1.001 | 0.313 | 3 |
| 102 | 1 | 1 | 0 | 1 | 1 | 1.115 | 1.001 | 0.313 | 3 |
| 103 | 1 | 1 | 0 | 1 | 1 | 1.111 | 1.001 | 0.313 | 3 |
| 104 | 1 | 1 | 0 | 1 | 1 | 1.112 | 1.001 | 0.313 | 3 |
| 105 | 1 | 1 | 1 | 1 | 1 | 1 | 1.001 | 0.313 | 4 |
| 106 | 1 | 1 | 1 | 1 | 1 | 1 | 1 | 0.313 | 4 |
| 107 | 1 | 1 | 0 | 1 | 1 | 1.112 | 1 | 0.313 | 3 |
| 108 | 1 | 1 | 0 | 1 | 1 | 1.112 | 1.001 | 0.313 | 3 |
| 109 | 1 | 1 | 1 | 1 | 1 | 1 | 1 | 0.313 | 4 |
| 110 | 1 | 1 | 1 | 1 | 1 | 1 | 1 | 0.313 | 4 |
| 111 | 1 | 1 | 1 | 1 | 1 | 1 | 1 | 0.313 | 4 |
| 112 | 1 | 1 | 1 | 1 | 1 | 1 | 1 | 0.313 | 4 |
| 113 | 1 | 1 | 1 | 1 | 1 | 1 | 1 | 0.313 | 4 |
| 114 | 1 | 1 | 1 | 1 | 1 | 1 | 1 | 0.313 | 4 |
| 115 | 1 | 1 | 1 | 1 | 1 | 1 | 1 | 0.313 | 4 |
| 116 | 1 | 1 | 1 | 1 | 1 | 1 | 1 | 0.313 | 4 |
| 117 | 1 | 1 | 1 | 1 | 1 | 1 | 1 | 0.313 | 4 |
| 118 | 1 | 1 | 1 | 1 | 1 | 1 | 1 | 0.313 | 4 |
| 119 | 1 | 1 | 1 | 1 | 1 | 1 | 1 | 0.313 | 4 |
| 120 | 1 | 1 | 1 | 1 | 1 | 1 | 1 | 0.313 | 4 |
| 121 | 1 | 1 | 1 | 1 | 1 | 1 | 1 | 0.313 | 4 |
| 122 | 1 | 1 | 1 | 1 | 1 | 1 | 1 | 0.313 | 4 |
| 123 | 1 | 1 | 1 | 1 | 1 | 1 | 1 | 0.313 | 4 |
| 124 | 1 | 1 | 1 | 1 | 1 | 1 | 1 | 0.313 | 4 |
| 125 | 1 | 1 | 1 | 1 | 1 | 1 | 1 | 0.313 | 4 |
| 126 | 1 | 1 | 1 | 1 | 1 | 1 | 1 | 0.313 | 4 |
| 127 | 1 | 1 | 1 | 1 | 1 | 1 | 1 | 0.313 | 4 |
| 128 | 1 | 1 | 1 | 1 | 1 | 1 | 1 | 0.313 | 4 |
| 129 | 1 | 1 | 1 | 1 | 1 | 1 | 1 | 0.313 | 4 |
| 130 | 1 | 1 | 1 | 1 | 1 | 1 | 1 | 0.313 | 4 |
| 131 | 1 | 1 | 1 | 1 | 1 | 1 | 1 | 0.313 | 4 |
| 132 | 1 | 1 | 1 | 1 | 1 | 1 | 1 | 0.313 | 4 |
| 133 | 1 | 1 | 1 | 1 | 1 | 1 | 1 | 0.313 | 4 |
| 134 | 1 | 1 | 1 | 1 | 1 | 1 | 1 | 0.313 | 4 |
| 135 | 1 | 1 | 1 | 1 | 1 | 1 | 1 | 0.313 | 4 |
| 136 | 1 | 1 | 1 | 1 | 1 | 1 | 1 | 0.313 | 4 |
| 137 | 1 | 1 | 1 | 1 | 1 | 1 | 1 | 0.313 | 4 |
| 138 | 1 | 1 | 1 | 1 | 1 | 1 | 1 | 0.313 | 4 |
| 139 | 1 | 1 | 1 | 1 | 1 | 1 | 1 | 0.313 | 4 |
| 140 | 1 | 1 | 1 | 1 | 1 | 1 | 1 | 0.313 | 4 |
| 141 | 1 | 1 | 0 | 1 | 1 | 1.111 | 1 | 0.313 | 3 |
| 142 | 1 | 1 | 1 | 1 | 1 | 1 | 1 | 0.313 | 4 |
| 143 | 1 | 1 | 1 | 1 | 1 | 1 | 1 | 0.313 | 4 |
| 144 | 1 | 1 | 1 | 1 | 1 | 1 | 1 | 0.313 | 4 |
| 145 | 1 | 1 | 1 | 1 | 1 | 1 | 1 | 0.313 | 4 |
| 146 | 1 | 1 | 1 | 1 | 1 | 1 | 1 | 0.313 | 4 |
| 147 | 1 | 1 | 1 | 1 | 1 | 1 | 1 | 0.313 | 4 |
| 148 | 1 | 1 | 1 | 1 | 1 | 1 | 1 | 0.313 | 4 |
| 149 | 1 | 1 | 1 | 1 | 1 | 1 | 1 | 0.313 | 4 |
| 150 | 1 | 1 | 1 | 1 | 1 | 1 | 1 | 0.313 | 4 |
| 151 | 1 | 1 | 1 | 1 | 1 | 1 | 1 | 0.313 | 4 |
| 152 | 1 | 1 | 1 | 1 | 1 | 1 | 1 | 0.313 | 4 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 153 | 1 | 1 | 1 | 1 | 1 | 1 | 1 | 0.313 | 4 |
| 154 | 1 | 1 | 1 | 1 | 1 | 1 | 1 | 0.313 | 4 |
| 155 | 1 | 1 | 1 | 1 | 1 | 1 | 1 | 0.313 | 4 |
| 156 | 1 | 1 | 1 | 1 | 1 | 1 | 1 | 0.313 | 4 |
| 157 | 1 | 1 | 1 | 1 | 1 | 1 | 1 | 0.313 | 4 |
| 158 | 1 | 1 | 1 | 1 | 1 | 1 | 1 | 0.313 | 4 |
| 159 | 1 | 1 | 1 | 1 | 1 | 1 | 1 | 0.313 | 4 |
| 160 | 1 | 1 | 1 | 1 | 1 | 1 | 1 | 0.313 | 4 |
| 161 | 1 | 1 | 1 | 1 | 1 | 1 | 1 | 0.313 | 4 |
| 162 | 1 | 1 | 1 | 1 | 1 | 1 | 1 | 0.313 | 4 |
| 163 | 1 | 1 | 0 | 1 | 1 | 1.111 | 1 | 0.313 | 3 |
| 164 | 1 | 1 | 1 | 1 | 1 | 1 | 1 | 0.313 | 4 |
| 165 | 1 | 1 | 1 | 1 | 1 | 1 | 1 | 0.313 | 4 |
| 166 | 1 | 1 | 0 | 1 | 1 | 1.111 | 1 | 0.313 | 3 |
| 167 | 1 | 1 | 1 | 1 | 1 | 1 | 1 | 0.313 | 4 |
| 168 | 1 | 1 | 1 | 1 | 1 | 1 | 1 | 0.313 | 4 |
| 169 | 1 | 1 | 1 | 1 | 1 | 1 | 1 | 0.313 | 4 |
| 170 | 1 | 1 | 1 | 1 | 1 | 1 | 1 | 0.313 | 4 |
| 171 | 1 | 1 | 1 | 1 | 1 | 1 | 1 | 0.313 | 4 |
| 172 | 1 | 1 | 1 | 1 | 1 | 1 | 1 | 0.313 | 4 |
| 173 | 1 | 1 | 1 | 1 | 1 | 1 | 1 | 0.313 | 4 |
| 174 | 1 | 1 | 1 | 1 | 1 | 1 | 1 | 0.313 | 4 |
| 175 | 1 | 1 | 1 | 1 | 1 | 1 | 1 | 0.313 | 4 |
| 176 | 1 | 1 | 1 | 1 | 1 | 1 | 1 | 0.313 | 4 |
| 177 | 1 | 1 | 1 | 1 | 1 | 1 | 1 | 0.313 | 4 |
| 178 | 1 | 1 | 1 | 1 | 1 | 1 | 1 | 0.313 | 4 |
| 179 | 1 | 1 | 1 | 1 | 1 | 1 | 1 | 0.313 | 4 |
| 180 | 1 | 1 | 1 | 1 | 1 | 1 | 1 | 0.313 | 4 |
| 181 | 1 | 1 | 1 | 1 | 1 | 1 | 1 | 0.313 | 4 |
| 182 | 1 | 1 | 1 | 1 | 1 | 1 | 1 | 0.313 | 4 |
| 183 | 1 | 1 | 1 | 1 | 1 | 1 | 1 | 0.313 | 4 |
| 184 | 1 | 1 | 1 | 1 | 1 | 1 | 1 | 0.313 | 4 |
| 185 | 1 | 1 | 1 | 1 | 1 | 1 | 1 | 0.313 | 4 |
| 186 | 1 | 1 | 1 | 1 | 1 | 1 | 1 | 0.313 | 4 |
| 187 | 1 | 1 | 1 | 1 | 1 | 1 | 1 | 0.313 | 4 |
| 188 | 1 | 1 | 1 | 1 | 1 | 1 | 1 | 0.313 | 4 |
| 189 | 1 | 1 | 1 | 1 | 1 | 1 | 1 | 0.313 | 4 |
| 190 | 1 | 1 | 1 | 1 | 1 | 1 | 1 | 0.313 | 4 |
| 191 | 1 | 1 | 1 | 1 | 1 | 1 | 1 | 0.313 | 4 |
| 192 | 1 | 1 | 1 | 1 | 1 | 1 | 1 | 0.313 | 4 |
| 193 | 1 | 1 | 1 | 1 | 1 | 1 | 1 | 0.313 | 4 |
| 194 | 1 | 1 | 1 | 1 | 1 | 1 | 1 | 0.313 | 4 |
| 195 | 1 | 1 | 1 | 1 | 1 | 1 | 1 | 0.313 | 4 |
| 196 | 1 | 1 | 1 | 1 | 1 | 1 | 1 | 0.313 | 4 |
| 197 | 1 | 1 | 1 | 1 | 1 | 1 | 1 | 0.313 | 4 |
| 198 | 1 | 1 | 1 | 1 | 1 | 1 | 1 | 0.313 | 4 |
| 199 | 1 | 1 | 1 | 1 | 1 | 1 | 1 | 0.313 | 4 |
| 200 | 1 | 1 | 1 | 1 | 1 | 1 | 1 | 0.313 | 4 |
| 201 | 1 | 1 | 1 | 1 | 1 | 1 | 1 | 0.313 | 4 |
| 202 | 1 | 1 | 1 | 1 | 1 | 1 | 0.985 | 0.314 | 4 |
| 203 | 1 | 1 | 1 | 1 | 1 | 1 | 0.994 | 0.315 | 4 |
| 204 | 1 | 1 | 1 | 1 | 1 | 1 | 0.999 | 0.316 | 4 |
| 205 | 1 | 1 | 1 | 1 | 1 | 1 | 1.006 | 0.317 | 4 |
| 206 | 1 | 1 | 1 | 1 | 1 | 1 | 1.008 | 0.317 | 4 |
| 207 | 1 | 1 | 0 | 1 | 1 | 1.289 | 1.027 | 0.317 | 3 |
| 208 | 1 | 1 | 1 | 1 | 1 | 1 | 1.004 | 0.317 | 4 |
| 209 | 1 | 1 | 1 | 1 | 1 | 1 | 1.001 | 0.317 | 4 |
| 210 | 1 | 1 | 1 | 1 | 1 | 1 | 0.999 | 0.317 | 4 |
| 211 | 1 | 1 | 1 | 1 | 1 | 1 | 0.995 | 0.317 | 4 |
| 212 | 1 | 1 | 1 | 1 | 1 | 1 | 0.996 | 0.318 | 4 |
| 213 | 1 | 1 | 0 | 1 | 1 | 1.185 | 1.013 | 0.318 | 3 |
| 214 | 1 | 1 | 1 | 1 | 1 | 1 | 0.977 | 0.318 | 4 |
| 215 | 1 | 1 | 1 | 1 | 1 | 1 | 0.985 | 0.318 | 4 |
| 216 | 1 | 1 | 1 | 1 | 1 | 1 | 1.005 | 0.318 | 4 |
| 217 | 1 | 1 | 1 | 1 | 1 | 1 | 1.007 | 0.318 | 4 |
| 218 | 1 | 1 | 1 | 1 | 1 | 1 | 1.001 | 0.319 | 4 |
| 219 | 1 | 1 | 1 | 1 | 1 | 1 | 1.005 | 0.319 | 4 |
| 220 | 1 | 1 | 1 | 1 | 1 | 1 | 1.002 | 0.32 | 4 |
| 221 | 1 | 1 | 1 | 1 | 1 | 1 | 0.999 | 0.32 | 4 |
| 222 | 1 | 1 | 1 | 1 | 1 | 1 | 1.006 | 0.32 | 4 |
| 223 | 1 | 1 | 1 | 1 | 1 | 1 | 0.994 | 0.32 | 4 |
| 224 | 1 | 1 | 1 | 1 | 1 | 1 | 1 | 0.321 | 4 |
| 225 | 1 | 1 | 1 | 1 | 1 | 1 | 0.998 | 0.321 | 4 |
| 226 | 1 | 1 | 1 | 1 | 1 | 1 | 1.001 | 0.322 | 4 |
| 227 | 1 | 1 | 1 | 1 | 1 | 1 | 0.993 | 0.322 | 4 |

-continued

| DATA APPENDIX | | | | | | | | | |
|---|---|---|---|---|---|---|---|---|---|
| frame | sat_ok | high_ok | low_ok | kp_saturation | kp_high_bin | kp_low_bin | gain_control | setpoint_out | state |
| 228 | 1 | 1 | 1 | 1 | 1 | 1 | 0.999 | 0.322 | 4 |
| 229 | 1 | 1 | 1 | 1 | 1 | 1 | 1.005 | 0.322 | 4 |
| 230 | 1 | 1 | 1 | 1 | 1 | 1 | 1.012 | 0.323 | 4 |
| 231 | 1 | 1 | 1 | 1 | 1 | 1 | 1.014 | 0.323 | 4 |
| 232 | 1 | 1 | 1 | 1 | 1 | 1 | 1.002 | 0.323 | 4 |
| 233 | 1 | 1 | 1 | 1 | 1 | 1 | 0.992 | 0.323 | 4 |
| 234 | 1 | 1 | 1 | 1 | 1 | 1 | 1.003 | 0.323 | 4 |
| 235 | 1 | 1 | 1 | 1 | 1 | 1 | 1.013 | 0.323 | 4 |
| 236 | 1 | 1 | 1 | 1 | 1 | 1 | 0.989 | 0.323 | 4 |
| 237 | 1 | 1 | 1 | 1 | 1 | 1 | 0.991 | 0.323 | 4 |
| 238 | 1 | 1 | 1 | 1 | 1 | 1 | 1.017 | 0.323 | 4 |
| 239 | 1 | 1 | 1 | 1 | 1 | 1 | 1.007 | 0.323 | 4 |
| 240 | 1 | 1 | 1 | 1 | 1 | 1 | 1.008 | 0.323 | 4 |
| 241 | 1 | 1 | 1 | 1 | 1 | 1 | 1.006 | 0.323 | 4 |
| 242 | 1 | 1 | 1 | 1 | 1 | 1 | 1.01 | 0.323 | 4 |
| 243 | 1 | 1 | 1 | 1 | 1 | 1 | 1 | 0.323 | 4 |
| 244 | 1 | 1 | 1 | 1 | 1 | 1 | 1.004 | 0.323 | 4 |
| 245 | 0 | 1 | 1 | 0.894 | 1 | 1 | 0.97 | 0.315 | 1 |
| 246 | 1 | 1 | 1 | 1 | 1 | 1 | 0.96 | 0.315 | 4 |
| 247 | 1 | 1 | 1 | 1 | 1 | 1 | 0.979 | 0.315 | 4 |
| 248 | 1 | 1 | 1 | 1 | 1 | 1 | 0.972 | 0.315 | 4 |
| 249 | 1 | 1 | 1 | 1 | 1 | 1 | 0.982 | 0.316 | 4 |
| 250 | 1 | 1 | 1 | 1 | 1 | 1 | 1.006 | 0.316 | 4 |
| 251 | 1 | 1 | 0 | 1 | 1 | 1.141 | 1.014 | 0.316 | 3 |
| 252 | 1 | 1 | 1 | 1 | 1 | 1 | 1.004 | 0.317 | 4 |
| 253 | 1 | 1 | 1 | 1 | 1 | 1 | 1.008 | 0.317 | 4 |
| 254 | 1 | 1 | 1 | 1 | 1 | 1 | 1.011 | 0.317 | 4 |
| 255 | 1 | 1 | 1 | 1 | 1 | 1 | 1.006 | 0.317 | 4 |
| 256 | 1 | 1 | 0 | 1 | 1 | 1.32 | 1.029 | 0.317 | 3 |
| 257 | 1 | 1 | 0 | 1 | 1 | 1.175 | 1.016 | 0.317 | 3 |
| 258 | 1 | 1 | 1 | 1 | 1 | 1 | 1.007 | 0.317 | 4 |
| 259 | 0 | 1 | 1 | 0.892 | 1 | 1 | 0.979 | 0.309 | 1 |
| 260 | 1 | 1 | 0 | 1 | 1 | 1.158 | 0.982 | 0.309 | 3 |
| 261 | 1 | 1 | 1 | 1 | 1 | 1 | 0.983 | 0.309 | 4 |
| 262 | 1 | 1 | 0 | 1 | 1 | 1.205 | 1.002 | 0.309 | 3 |
| 263 | 1 | 1 | 0 | 1 | 1 | 1.19 | 1.002 | 0.309 | 3 |
| 264 | 1 | 1 | 0 | 1 | 1 | 1.255 | 1.007 | 0.309 | 3 |
| 265 | 1 | 1 | 0 | 1 | 1 | 1.247 | 1.003 | 0.309 | 3 |
| 266 | 1 | 1 | 0 | 1 | 1 | 1.147 | 0.995 | 0.309 | 3 |
| 267 | 1 | 1 | 0 | 1 | 1 | 1.149 | 0.999 | 0.309 | 3 |
| 268 | 1 | 1 | 0 | 1 | 1 | 1.164 | 1.003 | 0.309 | 3 |
| 269 | 1 | 1 | 0 | 1 | 1 | 1.3 | 1.009 | 0.309 | 3 |
| 270 | 1 | 1 | 0 | 1 | 1 | 1.157 | 0.995 | 0.309 | 3 |
| 271 | 1 | 1 | 0 | 1 | 1 | 1.178 | 0.998 | 0.309 | 3 |
| 272 | 1 | 1 | 0 | 1 | 1 | 1.313 | 1.01 | 0.309 | 3 |
| 273 | 1 | 1 | 0 | 1 | 1 | 1.146 | 1 | 0.309 | 3 |
| 274 | 1 | 1 | 0 | 1 | 1 | 1.156 | 0.995 | 0.309 | 3 |
| 275 | 1 | 1 | 0 | 1 | 1 | 1.407 | 1.006 | 0.309 | 3 |
| 276 | 0 | 1 | 0 | 0.895 | 1 | 1.151 | 0.964 | 0.3 | 1 |
| 277 | 1 | 1 | 0 | 1 | 1 | 1.147 | 0.967 | 0.3 | 3 |
| 278 | 1 | 1 | 0 | 1 | 1 | 1.402 | 0.992 | 0.3 | 3 |
| 279 | 1 | 1 | 0 | 1 | 1 | 1.204 | 0.983 | 0.3 | 3 |
| 280 | 1 | 1 | 0 | 1 | 1 | 1.161 | 0.987 | 0.3 | 3 |
| 281 | 1 | 1 | 0 | 1 | 1 | 1.38 | 1 | 0.3 | 3 |
| 282 | 1 | 1 | 1 | 1 | 1 | 1 | 0.989 | 0.3 | 4 |
| 283 | 1 | 1 | 0 | 1 | 1 | 1.125 | 0.994 | 0.3 | 3 |
| 284 | 1 | 1 | 0 | 1 | 1 | 1.675 | 1.027 | 0.301 | 3 |
| 285 | 1 | 1 | 0 | 1 | 1 | 1.348 | 1.009 | 0.301 | 3 |
| 286 | 1 | 1 | 0 | 1 | 1 | 1.333 | 1.004 | 0.301 | 3 |
| 287 | 1 | 1 | 0 | 1 | 1 | 1.213 | 0.993 | 0.301 | 3 |
| 288 | 1 | 1 | 0 | 1 | 1 | 1.719 | 1.027 | 0.301 | 3 |
| 289 | 1 | 1 | 0 | 1 | 1 | 1.177 | 0.993 | 0.301 | 3 |
| 290 | 1 | 1 | 0 | 1 | 1 | 1.558 | 1.013 | 0.301 | 3 |
| 291 | 1 | 1 | 0 | 1 | 1 | 1.461 | 1.012 | 0.301 | 3 |
| 292 | 1 | 1 | 0 | 1 | 1 | 1.623 | 1.016 | 0.301 | 3 |
| 293 | 1 | 1 | 0 | 1 | 1 | 1.587 | 1.01 | 0.301 | 3 |
| 294 | 1 | 1 | 0 | 1 | 1 | 1.763 | 1.021 | 0.301 | 3 |
| 295 | 1 | 1 | 0 | 1 | 1 | 1.448 | 0.996 | 0.301 | 3 |
| 296 | 1 | 1 | 0 | 1 | 1 | 1.608 | 1.008 | 0.301 | 3 |
| 297 | 0 | 1 | 0 | 0.897 | 1 | 1.573 | 0.976 | 0.293 | 1 |
| 298 | 1 | 1 | 0 | 1 | 1 | 1.608 | 0.981 | 0.293 | 3 |
| 299 | 1 | 1 | 0 | 1 | 1 | 1.699 | 0.991 | 0.293 | 3 |
| 300 | 1 | 1 | 0 | 1 | 1 | 1.547 | 0.986 | 0.293 | 3 |
| 301 | 1 | 1 | 0 | 1 | 1 | 1.652 | 0.993 | 0.293 | 3 |
| 302 | 1 | 1 | 0 | 1 | 1 | 1.701 | 0.996 | 0.293 | 3 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 303 | 1 | 1 | 0 | 1 | 1 | 1.77 | 0.997 | 0.293 | 3 |
| 304 | 1 | 1 | 0 | 1 | 1 | 1.695 | 0.999 | 0.293 | 3 |
| 305 | 1 | 1 | 0 | 1 | 1 | 1.684 | 0.999 | 0.293 | 3 |
| 306 | 1 | 1 | 0 | 1 | 1 | 1.862 | 1.007 | 0.293 | 3 |
| 307 | 1 | 1 | 0 | 1 | 1 | 1.594 | 0.992 | 0.293 | 3 |
| 308 | 1 | 1 | 0 | 1 | 1 | 1.66 | 0.99 | 0.293 | 3 |
| 309 | 1 | 1 | 0 | 1 | 1 | 1.82 | 1.008 | 0.293 | 3 |
| 310 | 1 | 1 | 0 | 1 | 1 | 1.644 | 0.998 | 0.293 | 3 |
| 311 | 1 | 1 | 0 | 1 | 1 | 1.615 | 0.995 | 0.293 | 3 |
| 312 | 1 | 1 | 0 | 1 | 1 | 2.096 | 1.018 | 0.293 | 3 |
| 313 | 1 | 1 | 0 | 1 | 1 | 1.699 | 0.995 | 0.293 | 3 |
| 314 | 1 | 1 | 0 | 1 | 1 | 1.834 | 1.001 | 0.293 | 3 |
| 315 | 1 | 1 | 0 | 1 | 1 | 2.045 | 1.008 | 0.293 | 3 |
| 316 | 1 | 1 | 0 | 1 | 1 | 1.848 | 1.001 | 0.293 | 3 |
| 317 | 1 | 1 | 0 | 1 | 1 | 1.747 | 0.993 | 0.293 | 3 |
| 318 | 1 | 1 | 0 | 1 | 1 | 2.281 | 1.021 | 0.293 | 3 |
| 319 | 0 | 1 | 0 | 0.889 | 1 | 1.872 | 0.973 | 0.285 | 1 |
| 320 | 1 | 1 | 0 | 1 | 1 | 1.769 | 0.971 | 0.285 | 3 |
| 321 | 1 | 1 | 0 | 1 | 1 | 1.996 | 0.985 | 0.285 | 3 |
| 322 | 1 | 1 | 0 | 1 | 1 | 1.887 | 0.989 | 0.285 | 3 |
| 323 | 1 | 1 | 0 | 1 | 1 | 1.832 | 0.985 | 0.285 | 3 |
| 324 | 1 | 1 | 0 | 1 | 1 | 2.254 | 1.012 | 0.285 | 3 |
| 325 | 1 | 1 | 0 | 1 | 1 | 1.998 | 1.002 | 0.285 | 3 |
| 326 | 1 | 1 | 0 | 1 | 1 | 1.488 | 0.972 | 0.285 | 3 |
| 327 | 1 | 1 | 0 | 1 | 1 | 1.831 | 0.992 | 0.285 | 3 |
| 328 | 1 | 1 | 0 | 1 | 1 | 1.836 | 0.996 | 0.285 | 3 |
| 329 | 1 | 1 | 0 | 1 | 1 | 1.808 | 0.998 | 0.285 | 3 |
| 330 | 1 | 1 | 0 | 1 | 1 | 1.899 | 0.998 | 0.285 | 3 |
| 331 | 1 | 1 | 0 | 1 | 1 | 2.219 | 1.007 | 0.285 | 3 |
| 332 | 1 | 1 | 0 | 1 | 1 | 1.641 | 0.983 | 0.285 | 3 |
| 333 | 1 | 1 | 0 | 1 | 1 | 2.161 | 1.002 | 0.285 | 3 |
| 334 | 1 | 1 | 0 | 1 | 1 | 1.905 | 0.992 | 0.285 | 3 |
| 335 | 1 | 1 | 0 | 1 | 1 | 1.842 | 0.994 | 0.285 | 3 |
| 336 | 1 | 1 | 0 | 1 | 1 | 2.004 | 0.999 | 0.285 | 3 |
| 337 | 1 | 1 | 0 | 1 | 1 | 1.663 | 0.982 | 0.285 | 3 |
| 338 | 1 | 1 | 0 | 1 | 1 | 1.792 | 0.989 | 0.285 | 3 |
| 339 | 1 | 1 | 0 | 1 | 1 | 1.495 | 0.977 | 0.285 | 3 |
| 340 | 1 | 1 | 0 | 1 | 1 | 1.964 | 1.004 | 0.285 | 3 |
| 341 | 1 | 1 | 0 | 1 | 1 | 1.393 | 0.975 | 0.285 | 3 |
| 342 | 1 | 1 | 0 | 1 | 1 | 1.482 | 0.98 | 0.285 | 3 |
| 343 | 1 | 1 | 0 | 1 | 1 | 1.415 | 0.981 | 0.285 | 3 |
| 344 | 1 | 1 | 0 | 1 | 1 | 1.357 | 0.983 | 0.285 | 3 |
| 345 | 1 | 1 | 0 | 1 | 1 | 1.282 | 0.982 | 0.286 | 3 |
| 346 | 1 | 1 | 0 | 1 | 1 | 1.512 | 0.999 | 0.286 | 3 |
| 347 | 1 | 1 | 0 | 1 | 1 | 1.238 | 0.983 | 0.286 | 3 |
| 348 | 1 | 1 | 0 | 1 | 1 | 1.46 | 1 | 0.286 | 3 |
| 349 | 1 | 1 | 0 | 1 | 1 | 1.515 | 1.006 | 0.286 | 3 |
| 350 | 1 | 1 | 0 | 1 | 1 | 1.22 | 0.99 | 0.286 | 3 |
| 351 | 1 | 1 | 0 | 1 | 1 | 1.329 | 0.995 | 0.287 | 3 |
| 352 | 1 | 1 | 0 | 1 | 1 | 1.405 | 1.008 | 0.287 | 3 |
| 353 | 1 | 1 | 0 | 1 | 1 | 1.487 | 1.012 | 0.287 | 3 |
| 354 | 1 | 1 | 0 | 1 | 1 | 1.311 | 0.999 | 0.287 | 3 |
| 355 | 1 | 1 | 0 | 1 | 1 | 1.27 | 0.998 | 0.287 | 3 |
| 356 | 1 | 1 | 0 | 1 | 1 | 1.308 | 1.009 | 0.287 | 3 |
| 357 | 1 | 1 | 0 | 1 | 1 | 1.337 | 1.015 | 0.288 | 3 |
| 358 | 1 | 1 | 0 | 1 | 1 | 1.5 | 1.026 | 0.288 | 3 |
| 359 | 1 | 1 | 0 | 1 | 1 | 1.496 | 1.018 | 0.288 | 3 |
| 360 | 1 | 1 | 0 | 1 | 1 | 1.473 | 1.013 | 0.288 | 3 |
| 361 | 1 | 1 | 0 | 1 | 1 | 1.467 | 1.018 | 0.288 | 3 |
| 362 | 1 | 1 | 0 | 1 | 1 | 1.496 | 1.004 | 0.288 | 3 |
| 363 | 1 | 1 | 0 | 1 | 1 | 1.528 | 1.011 | 0.288 | 3 |
| 364 | 1 | 1 | 0 | 1 | 1 | 1.703 | 1.017 | 0.288 | 3 |
| 365 | 1 | 1 | 0 | 1 | 1 | 1.945 | 1.024 | 0.289 | 3 |
| 366 | 1 | 1 | 0 | 1 | 1 | 1.716 | 1.011 | 0.289 | 3 |
| 367 | 1 | 1 | 0 | 1 | 1 | 1.777 | 1.009 | 0.289 | 3 |
| 368 | 1 | 1 | 0 | 1 | 1 | 1.919 | 1.014 | 0.289 | 3 |
| 369 | 1 | 1 | 0 | 1 | 1 | 1.904 | 1.009 | 0.289 | 3 |
| 370 | 1 | 1 | 0 | 1 | 1 | 2.377 | 1.022 | 0.289 | 3 |
| 371 | 1 | 1 | 0 | 1 | 1 | 2.261 | 1.016 | 0.289 | 3 |
| 372 | 1 | 1 | 0 | 1 | 1 | 1.947 | 0.996 | 0.289 | 3 |
| 373 | 0 | 1 | 0 | 0.897 | 1 | 1.985 | 0.968 | 0.281 | 1 |
| 374 | 1 | 1 | 0 | 1 | 1 | 2.155 | 0.984 | 0.281 | 3 |
| 375 | 1 | 1 | 0 | 1 | 1 | 2.049 | 0.983 | 0.281 | 3 |
| 376 | 1 | 1 | 0 | 1 | 1 | 2.13 | 0.987 | 0.281 | 3 |
| 377 | 1 | 1 | 0 | 1 | 1 | 2.242 | 0.997 | 0.281 | 3 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 378 | 1 | 1 | 0 | 1 | 1 | 2.237 | 0.993 | 0.281 | 3 |
| 379 | 1 | 1 | 0 | 1 | 1 | 2.04 | 0.99 | 0.281 | 3 |
| 380 | 1 | 1 | 0 | 1 | 1 | 2.848 | 1.019 | 0.281 | 3 |
| 381 | 1 | 1 | 0 | 1 | 1 | 2.627 | 1.008 | 0.281 | 3 |
| 382 | 1 | 1 | 0 | 1 | 1 | 2.399 | 0.996 | 0.281 | 3 |
| 383 | 1 | 1 | 0 | 1 | 1 | 2.76 | 1.011 | 0.281 | 3 |
| 384 | 1 | 1 | 0 | 1 | 1 | 2.496 | 0.998 | 0.281 | 3 |
| 385 | 1 | 1 | 0 | 1 | 1 | 2.363 | 0.992 | 0.281 | 3 |
| 386 | 1 | 1 | 0 | 1 | 1 | 2.407 | 0.989 | 0.281 | 3 |
| 387 | 1 | 1 | 0 | 1 | 1 | 2.518 | 0.996 | 0.281 | 3 |
| 388 | 1 | 1 | 0 | 1 | 1 | 2.443 | 0.994 | 0.281 | 3 |
| 389 | 1 | 1 | 0 | 1 | 1 | 2.841 | 1.001 | 0.281 | 3 |
| 390 | 1 | 1 | 0 | 1 | 1 | 2.728 | 0.998 | 0.281 | 3 |
| 391 | 1 | 1 | 0 | 1 | 1 | 2.688 | 0.998 | 0.281 | 3 |
| 392 | 1 | 1 | 0 | 1 | 1 | 3.268 | 1.014 | 0.281 | 3 |
| 393 | 1 | 1 | 0 | 1 | 1 | 2.87 | 0.999 | 0.281 | 3 |
| 394 | 1 | 1 | 0 | 1 | 1 | 3.031 | 0.999 | 0.281 | 3 |
| 395 | 1 | 1 | 0 | 1 | 1 | 2.896 | 0.989 | 0.281 | 3 |
| 396 | 1 | 1 | 0 | 1 | 1 | 2.661 | 0.986 | 0.281 | 3 |
| 397 | 1 | 1 | 0 | 1 | 1 | 2.636 | 0.98 | 0.281 | 3 |
| 398 | 1 | 1 | 0 | 1 | 1 | 3.184 | 1.003 | 0.281 | 3 |
| 399 | 1 | 1 | 0 | 1 | 1 | 2.886 | 0.994 | 0.281 | 3 |
| 400 | 1 | 1 | 0 | 1 | 1 | 2.875 | 0.991 | 0.281 | 3 |
| 401 | 1 | 1 | 0 | 1 | 1 | 3.123 | 1.003 | 0.281 | 3 |
| 402 | 1 | 1 | 0 | 1 | 1 | 3.024 | 0.997 | 0.281 | 3 |
| 403 | 1 | 1 | 0 | 1 | 1 | 3.27 | 1.007 | 0.281 | 3 |
| 404 | 1 | 1 | 0 | 1 | 1 | 3.366 | 1.007 | 0.281 | 3 |
| 405 | 1 | 1 | 0 | 1 | 1 | 2.917 | 0.987 | 0.281 | 3 |
| 406 | 1 | 1 | 0 | 1 | 1 | 3.099 | 0.995 | 0.281 | 3 |
| 407 | 1 | 1 | 0 | 1 | 1 | 2.931 | 0.997 | 0.281 | 3 |
| 408 | 1 | 1 | 0 | 1 | 1 | 2.888 | 0.991 | 0.281 | 3 |
| 409 | 1 | 1 | 0 | 1 | 1 | 3.254 | 1.004 | 0.281 | 3 |
| 410 | 1 | 1 | 0 | 1 | 1 | 2.718 | 0.981 | 0.281 | 3 |
| 411 | 1 | 1 | 0 | 1 | 1 | 2.776 | 0.987 | 0.281 | 3 |
| 412 | 1 | 1 | 0 | 1 | 1 | 2.849 | 0.992 | 0.281 | 3 |
| 413 | 1 | 1 | 0 | 1 | 1 | 2.783 | 0.985 | 0.281 | 3 |
| 414 | 1 | 1 | 0 | 1 | 1 | 3.066 | 1 | 0.281 | 3 |
| 415 | 1 | 1 | 0 | 1 | 1 | 2.478 | 0.982 | 0.281 | 3 |
| 416 | 1 | 1 | 0 | 1 | 1 | 2.671 | 0.985 | 0.281 | 3 |
| 417 | 1 | 1 | 0 | 1 | 1 | 2.876 | 0.997 | 0.281 | 3 |
| 418 | 1 | 1 | 0 | 1 | 1 | 2.627 | 0.99 | 0.281 | 3 |
| 419 | 1 | 1 | 0 | 1 | 1 | 2.798 | 1.001 | 0.281 | 3 |
| 420 | 1 | 1 | 0 | 1 | 1 | 2.736 | 1.001 | 0.281 | 3 |
| 421 | 1 | 1 | 0 | 1 | 1 | 2.667 | 0.995 | 0.281 | 3 |
| 422 | 1 | 1 | 0 | 1 | 1 | 2.429 | 0.988 | 0.282 | 3 |
| 423 | 1 | 1 | 0 | 1 | 1 | 2.662 | 0.998 | 0.282 | 3 |
| 424 | 1 | 1 | 0 | 1 | 1 | 2.285 | 0.982 | 0.282 | 3 |
| 425 | 1 | 1 | 0 | 1 | 1 | 2.553 | 0.993 | 0.282 | 3 |
| 426 | 1 | 1 | 0 | 1 | 1 | 2.392 | 0.994 | 0.282 | 3 |
| 427 | 1 | 1 | 0 | 1 | 1 | 2.323 | 0.982 | 0.282 | 3 |
| 428 | 1 | 1 | 0 | 1 | 1 | 2.172 | 0.985 | 0.282 | 3 |
| 429 | 1 | 1 | 0 | 1 | 1 | 2.304 | 0.994 | 0.282 | 3 |
| 430 | 1 | 1 | 0 | 1 | 1 | 2.327 | 0.999 | 0.282 | 3 |
| 431 | 1 | 1 | 0 | 1 | 1 | 1.844 | 0.978 | 0.282 | 3 |
| 432 | 1 | 1 | 0 | 1 | 1 | 2.183 | 0.991 | 0.282 | 3 |
| 433 | 1 | 1 | 0 | 1 | 1 | 2.053 | 0.989 | 0.282 | 3 |
| 434 | 1 | 1 | 0 | 1 | 1 | 1.941 | 0.989 | 0.283 | 3 |
| 435 | 1 | 1 | 0 | 1 | 1 | 2.059 | 0.998 | 0.283 | 3 |
| 436 | 1 | 1 | 0 | 1 | 1 | 1.927 | 0.997 | 0.283 | 3 |
| 437 | 1 | 1 | 0 | 1 | 1 | 1.958 | 0.997 | 0.283 | 3 |
| 438 | 1 | 1 | 0 | 1 | 1 | 1.673 | 0.982 | 0.283 | 3 |
| 439 | 1 | 1 | 0 | 1 | 1 | 1.795 | 0.992 | 0.283 | 3 |
| 440 | 1 | 1 | 0 | 1 | 1 | 1.74 | 0.994 | 0.283 | 3 |
| 441 | 1 | 1 | 0 | 1 | 1 | 1.644 | 0.997 | 0.283 | 3 |
| 442 | 1 | 1 | 0 | 1 | 1 | 1.968 | 1.008 | 0.283 | 3 |
| 443 | 1 | 1 | 0 | 1 | 1 | 1.776 | 0.993 | 0.284 | 3 |
| 444 | 1 | 1 | 0 | 1 | 1 | 1.809 | 1.002 | 0.284 | 3 |
| 445 | 1 | 1 | 0 | 1 | 1 | 1.718 | 0.993 | 0.284 | 3 |
| 446 | 1 | 1 | 0 | 1 | 1 | 1.354 | 0.977 | 0.284 | 3 |
| 447 | 1 | 1 | 0 | 1 | 1 | 1.372 | 0.983 | 0.284 | 3 |
| 448 | 1 | 1 | 0 | 1 | 1 | 1.558 | 0.993 | 0.284 | 3 |
| 449 | 1 | 1 | 0 | 1 | 1 | 1.624 | 1.002 | 0.284 | 3 |
| 450 | 1 | 1 | 0 | 1 | 1 | 1.413 | 0.995 | 0.284 | 3 |
| 451 | 1 | 1 | 0 | 1 | 1 | 1.339 | 0.991 | 0.284 | 3 |
| 452 | 1 | 1 | 0 | 1 | 1 | 1.327 | 0.99 | 0.285 | 3 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 453 | 1 | 1 | 0 | 1 | 1 | 1.324 | 0.991 | 0.285 | 3 |
| 454 | 1 | 1 | 0 | 1 | 1 | 1.607 | 1.013 | 0.285 | 3 |
| 455 | 1 | 1 | 0 | 1 | 1 | 1.433 | 0.999 | 0.285 | 3 |
| 456 | 1 | 1 | 0 | 1 | 1 | 1.39 | 0.994 | 0.285 | 3 |
| 457 | 1 | 1 | 0 | 1 | 1 | 1.405 | 0.996 | 0.285 | 3 |
| 458 | 1 | 1 | 0 | 1 | 1 | 1.343 | 0.991 | 0.285 | 3 |
| 459 | 1 | 1 | 0 | 1 | 1 | 1.506 | 1.002 | 0.285 | 3 |
| 460 | 1 | 1 | 0 | 1 | 1 | 1.629 | 1.008 | 0.285 | 3 |
| 461 | 1 | 1 | 0 | 1 | 1 | 1.494 | 0.997 | 0.286 | 3 |
| 462 | 1 | 1 | 0 | 1 | 1 | 1.551 | 0.995 | 0.286 | 3 |
| 463 | 1 | 1 | 0 | 1 | 1 | 1.82 | 1.014 | 0.286 | 3 |
| 464 | 1 | 1 | 0 | 1 | 1 | 1.777 | 1.009 | 0.286 | 3 |
| 465 | 1 | 1 | 0 | 1 | 1 | 1.535 | 0.986 | 0.286 | 3 |
| 466 | 1 | 1 | 0 | 1 | 1 | 1.967 | 1.013 | 0.286 | 3 |
| 467 | 1 | 1 | 0 | 1 | 1 | 1.91 | 1.006 | 0.286 | 3 |
| 468 | 1 | 1 | 0 | 1 | 1 | 1.768 | 0.996 | 0.286 | 3 |
| 469 | 1 | 1 | 0 | 1 | 1 | 2.228 | 1.015 | 0.286 | 3 |
| 470 | 1 | 1 | 0 | 1 | 1 | 1.946 | 1 | 0.286 | 3 |
| 471 | 1 | 1 | 0 | 1 | 1 | 1.861 | 0.989 | 0.286 | 3 |
| 472 | 1 | 1 | 0 | 1 | 1 | 2.252 | 1.008 | 0.286 | 3 |
| 473 | 1 | 1 | 0 | 1 | 1 | 2.216 | 1.004 | 0.286 | 3 |
| 474 | 1 | 1 | 0 | 1 | 1 | 1.995 | 0.992 | 0.286 | 3 |
| 475 | 1 | 1 | 0 | 1 | 1 | 2.514 | 1.008 | 0.286 | 3 |
| 476 | 1 | 1 | 0 | 1 | 1 | 2.565 | 1.01 | 0.286 | 3 |
| 477 | 1 | 1 | 0 | 1 | 1 | 2.382 | 1.004 | 0.287 | 3 |
| 478 | 1 | 1 | 0 | 1 | 1 | 2.436 | 1.002 | 0.287 | 3 |
| 479 | 1 | 1 | 0 | 1 | 1 | 2.629 | 1.006 | 0.287 | 3 |
| 480 | 1 | 1 | 0 | 1 | 1 | 2.422 | 0.995 | 0.287 | 3 |
| 481 | 1 | 1 | 0 | 1 | 1 | 2.309 | 0.992 | 0.287 | 3 |
| 482 | 1 | 1 | 0 | 1 | 1 | 2.748 | 1.007 | 0.287 | 3 |
| 483 | 1 | 1 | 0 | 1 | 1 | 2.396 | 0.989 | 0.287 | 3 |
| 484 | 1 | 1 | 0 | 1 | 1 | 2.396 | 0.99 | 0.287 | 3 |
| 485 | 1 | 1 | 0 | 1 | 1 | 2.559 | 1 | 0.287 | 3 |
| 486 | 1 | 1 | 0 | 1 | 1 | 2.264 | 0.988 | 0.287 | 3 |
| 487 | 1 | 1 | 0 | 1 | 1 | 2.237 | 0.99 | 0.287 | 3 |
| 488 | 1 | 1 | 0 | 1 | 1 | 2.688 | 1.003 | 0.287 | 3 |
| 489 | 1 | 1 | 0 | 1 | 1 | 2.365 | 0.993 | 0.287 | 3 |
| 490 | 1 | 1 | 0 | 1 | 1 | 2.526 | 0.999 | 0.287 | 3 |
| 491 | 1 | 1 | 0 | 1 | 1 | 2.494 | 1.001 | 0.287 | 3 |
| 492 | 1 | 1 | 0 | 1 | 1 | 2.618 | 0.998 | 0.287 | 3 |
| 493 | 1 | 1 | 0 | 1 | 1 | 2.422 | 0.993 | 0.287 | 3 |
| 494 | 1 | 1 | 0 | 1 | 1 | 2.525 | 0.997 | 0.287 | 3 |
| 495 | 1 | 1 | 0 | 1 | 1 | 2.782 | 1 | 0.287 | 3 |
| 496 | 1 | 1 | 0 | 1 | 1 | 2.667 | 0.996 | 0.287 | 3 |
| 497 | 1 | 1 | 0 | 1 | 1 | 2.836 | 1.002 | 0.287 | 3 |
| 498 | 1 | 1 | 0 | 1 | 1 | 2.678 | 0.992 | 0.287 | 3 |
| 499 | 1 | 1 | 0 | 1 | 1 | 2.365 | 0.981 | 0.287 | 3 |
| 500 | 1 | 1 | 0 | 1 | 1 | 2.867 | 1.004 | 0.287 | 3 |
| 501 | 1 | 1 | 0 | 1 | 1 | 2.629 | 0.996 | 0.287 | 3 |
| 502 | 1 | 1 | 0 | 1 | 1 | 2.596 | 0.989 | 0.287 | 3 |
| 503 | 1 | 1 | 0 | 1 | 1 | 2.745 | 0.996 | 0.287 | 3 |
| 504 | 1 | 1 | 0 | 1 | 1 | 2.62 | 0.991 | 0.287 | 3 |
| 505 | 1 | 1 | 0 | 1 | 1 | 2.776 | 0.993 | 0.287 | 3 |
| 506 | 1 | 1 | 0 | 1 | 1 | 2.645 | 0.989 | 0.287 | 3 |
| 507 | 1 | 1 | 0 | 1 | 1 | 2.725 | 0.995 | 0.287 | 3 |
| 508 | 1 | 1 | 0 | 1 | 1 | 2.886 | 0.996 | 0.287 | 3 |
| 509 | 1 | 1 | 0 | 1 | 1 | 2.678 | 0.992 | 0.287 | 3 |
| 510 | 1 | 1 | 0 | 1 | 1 | 2.829 | 0.996 | 0.287 | 3 |
| 511 | 1 | 1 | 0 | 1 | 1 | 2.647 | 0.989 | 0.287 | 3 |
| 512 | 1 | 1 | 0 | 1 | 1 | 2.54 | 0.986 | 0.287 | 3 |
| 513 | 1 | 1 | 0 | 1 | 1 | 2.983 | 0.998 | 0.287 | 3 |
| 514 | 1 | 1 | 0 | 1 | 1 | 2.719 | 0.99 | 0.287 | 3 |
| 515 | 1 | 1 | 0 | 1 | 1 | 2.966 | 1.003 | 0.287 | 3 |
| 516 | 1 | 1 | 0 | 1 | 1 | 2.694 | 0.99 | 0.287 | 3 |
| 517 | 0 | 1 | 0 | 0.889 | 1 | 2.615 | 0.953 | 0.279 | 1 |
| 518 | 1 | 1 | 0 | 1 | 1 | 2.581 | 0.946 | 0.279 | 3 |
| 519 | 1 | 1 | 0 | 1 | 1 | 2.86 | 0.963 | 0.279 | 3 |
| 520 | 1 | 1 | 0 | 1 | 1 | 3.044 | 0.977 | 0.279 | 3 |
| 521 | 1 | 1 | 0 | 1 | 1 | 2.837 | 0.973 | 0.279 | 3 |
| 522 | 1 | 1 | 0 | 1 | 1 | 3.379 | 0.995 | 0.279 | 3 |
| 523 | 1 | 1 | 0 | 1 | 1 | 2.91 | 0.982 | 0.279 | 3 |
| 524 | 1 | 1 | 0 | 1 | 1 | 3.127 | 0.99 | 0.279 | 3 |
| 525 | 1 | 1 | 0 | 1 | 1 | 3.457 | 1 | 0.279 | 3 |
| 526 | 1 | 1 | 0 | 1 | 1 | 3.134 | 0.99 | 0.279 | 3 |
| 527 | 1 | 1 | 0 | 1 | 1 | 2.943 | 0.988 | 0.279 | 3 |

-continued

| DATA APPENDIX | | | | | | | | | |
|---|---|---|---|---|---|---|---|---|---|
| frame | sat_ok | high_ok | low_ok | kp_saturation | kp_high_bin | kp_low_bin | gain_control | setpoint_out | state |
| 528 | 1 | 1 | 0 | 1 | 1 | 3.255 | 0.994 | 0.279 | 3 |
| 529 | 1 | 1 | 0 | 1 | 1 | 3.234 | 1.003 | 0.279 | 3 |
| 530 | 1 | 1 | 0 | 1 | 1 | 2.789 | 0.985 | 0.279 | 3 |
| 531 | 1 | 1 | 0 | 1 | 1 | 2.923 | 0.989 | 0.279 | 3 |
| 532 | 1 | 1 | 0 | 1 | 1 | 2.946 | 0.992 | 0.279 | 3 |
| 533 | 1 | 1 | 0 | 1 | 1 | 2.622 | 0.985 | 0.279 | 3 |
| 534 | 1 | 1 | 0 | 1 | 1 | 2.599 | 0.986 | 0.279 | 3 |
| 535 | 1 | 1 | 0 | 1 | 1 | 2.986 | 0.999 | 0.279 | 3 |
| 536 | 1 | 1 | 0 | 1 | 1 | 2.46 | 0.986 | 0.279 | 3 |
| 537 | 1 | 1 | 0 | 1 | 1 | 2.525 | 0.99 | 0.279 | 3 |
| 538 | 1 | 1 | 0 | 1 | 1 | 2.394 | 0.99 | 0.279 | 3 |
| 539 | 1 | 1 | 0 | 1 | 1 | 2.233 | 0.986 | 0.279 | 3 |
| 540 | 1 | 1 | 0 | 1 | 1 | 2.357 | 0.993 | 0.279 | 3 |
| 541 | 1 | 1 | 0 | 1 | 1 | 2.29 | 0.993 | 0.279 | 3 |
| 542 | 1 | 1 | 0 | 1 | 1 | 2.047 | 0.989 | 0.279 | 3 |
| 543 | 1 | 1 | 0 | 1 | 1 | 2.087 | 0.993 | 0.279 | 3 |
| 544 | 1 | 1 | 0 | 1 | 1 | 2.046 | 0.993 | 0.279 | 3 |
| 545 | 1 | 1 | 0 | 1 | 1 | 1.893 | 0.989 | 0.279 | 3 |
| 546 | 1 | 1 | 0 | 1 | 1 | 1.904 | 0.991 | 0.279 | 3 |
| 547 | 1 | 1 | 0 | 1 | 1 | 1.718 | 0.989 | 0.28 | 3 |
| 548 | 1 | 1 | 0 | 1 | 1 | 1.821 | 0.995 | 0.28 | 3 |
| 549 | 1 | 1 | 0 | 1 | 1 | 1.549 | 0.988 | 0.28 | 3 |
| 550 | 1 | 1 | 0 | 1 | 1 | 1.891 | 1.003 | 0.28 | 3 |
| 551 | 1 | 1 | 0 | 1 | 1 | 1.722 | 1.002 | 0.28 | 3 |
| 552 | 1 | 1 | 0 | 1 | 1 | 1.773 | 1.005 | 0.28 | 3 |
| 553 | 1 | 1 | 0 | 1 | 1 | 1.697 | 1.003 | 0.28 | 3 |
| 554 | 1 | 1 | 0 | 1 | 1 | 1.389 | 0.986 | 0.28 | 3 |
| 555 | 1 | 1 | 0 | 1 | 1 | 1.188 | 0.979 | 0.28 | 3 |
| 556 | 1 | 1 | 0 | 1 | 1 | 1.197 | 0.989 | 0.28 | 3 |
| 557 | 1 | 1 | 1 | 1 | 1 | 1 | 0.987 | 0.28 | 4 |
| 558 | 1 | 1 | 1 | 1 | 1 | 1 | 0.982 | 0.282 | 4 |
| 559 | 1 | 1 | 1 | 1 | 1 | 1 | 0.996 | 0.283 | 4 |
| 560 | 1 | 1 | 1 | 1 | 1 | 1 | 0.989 | 0.284 | 4 |
| 561 | 1 | 1 | 1 | 1 | 1 | 1 | 1.001 | 0.286 | 4 |
| 562 | 1 | 1 | 1 | 1 | 1 | 1 | 1 | 0.287 | 4 |
| 563 | 1 | 1 | 1 | 1 | 1 | 1 | 0.988 | 0.287 | 4 |
| 564 | 1 | 1 | 1 | 1 | 1 | 1 | 0.993 | 0.288 | 4 |
| 565 | 1 | 1 | 1 | 1 | 1 | 1 | 1.011 | 0.29 | 4 |
| 566 | 1 | 1 | 1 | 1 | 1 | 1 | 0.998 | 0.29 | 4 |
| 567 | 1 | 1 | 1 | 1 | 1 | 1 | 0.985 | 0.291 | 4 |
| 568 | 1 | 1 | 1 | 1 | 1 | 1 | 0.994 | 0.292 | 4 |
| 569 | 1 | 1 | 1 | 1 | 1 | 1 | 0.995 | 0.292 | 4 |
| 570 | 1 | 1 | 1 | 1 | 1 | 1 | 0.993 | 0.293 | 4 |
| 571 | 1 | 1 | 1 | 1 | 1 | 1 | 1.005 | 0.294 | 4 |
| 572 | 1 | 1 | 1 | 1 | 1 | 1 | 1 | 0.295 | 4 |
| 573 | 1 | 1 | 1 | 1 | 1 | 1 | 0.995 | 0.296 | 4 |
| 574 | 1 | 1 | 1 | 1 | 1 | 1 | 0.992 | 0.296 | 4 |
| 575 | 1 | 1 | 1 | 1 | 1 | 1 | 0.993 | 0.297 | 4 |
| 576 | 1 | 1 | 1 | 1 | 1 | 1 | 0.995 | 0.297 | 4 |
| 577 | 1 | 1 | 1 | 1 | 1 | 1 | 0.988 | 0.298 | 4 |
| 578 | 1 | 1 | 1 | 1 | 1 | 1 | 1.003 | 0.298 | 4 |
| 579 | 1 | 1 | 1 | 1 | 1 | 1 | 0.998 | 0.299 | 4 |
| 580 | 1 | 1 | 1 | 1 | 1 | 1 | 0.996 | 0.299 | 4 |
| 581 | 1 | 1 | 1 | 1 | 1 | 1 | 1.002 | 0.3 | 4 |
| 582 | 1 | 1 | 1 | 1 | 1 | 1 | 0.995 | 0.3 | 4 |
| 583 | 1 | 1 | 1 | 1 | 1 | 1 | 0.998 | 0.3 | 4 |
| 584 | 1 | 1 | 1 | 1 | 1 | 1 | 0.999 | 0.3 | 4 |
| 585 | 1 | 1 | 1 | 1 | 1 | 1 | 0.997 | 0.3 | 4 |
| 586 | 1 | 1 | 1 | 1 | 1 | 1 | 0.992 | 0.3 | 4 |
| 587 | 1 | 1 | 1 | 1 | 1 | 1 | 0.996 | 0.301 | 4 |
| 588 | 1 | 1 | 1 | 1 | 1 | 1 | 0.988 | 0.301 | 4 |
| 589 | 1 | 1 | 1 | 1 | 1 | 1 | 0.993 | 0.301 | 4 |
| 590 | 1 | 1 | 1 | 1 | 1 | 1 | 0.997 | 0.301 | 4 |
| 591 | 1 | 1 | 1 | 1 | 1 | 1 | 0.986 | 0.301 | 4 |
| 592 | 1 | 1 | 1 | 1 | 1 | 1 | 0.983 | 0.301 | 4 |
| 593 | 1 | 1 | 1 | 1 | 1 | 1 | 0.986 | 0.301 | 4 |
| 594 | 1 | 1 | 1 | 1 | 1 | 1 | 0.989 | 0.302 | 4 |
| 595 | 1 | 1 | 1 | 1 | 1 | 1 | 0.986 | 0.302 | 4 |
| 596 | 1 | 1 | 1 | 1 | 1 | 1 | 0.988 | 0.303 | 4 |
| 597 | 1 | 1 | 1 | 1 | 1 | 1 | 0.979 | 0.303 | 4 |
| 598 | 1 | 1 | 1 | 1 | 1 | 1 | 0.987 | 0.304 | 4 |
| 599 | 1 | 1 | 1 | 1 | 1 | 1 | 0.986 | 0.305 | 4 |
| 600 | 1 | 1 | 1 | 1 | 1 | 1 | 0.987 | 0.305 | 4 |
| 601 | 1 | 1 | 1 | 1 | 1 | 1 | 0.988 | 0.306 | 4 |
| 602 | 1 | 1 | 1 | 1 | 1 | 1 | 0.994 | 0.307 | 4 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 603 | 1 | 1 | 1 | 1 | 1 | 1 | 0.99 | 0.307 | 4 |
| 604 | 1 | 1 | 1 | 1 | 1 | 1 | 0.986 | 0.308 | 4 |
| 605 | 1 | 1 | 1 | 1 | 1 | 1 | 1 | 0.309 | 4 |
| 606 | 1 | 1 | 1 | 1 | 1 | 1 | 0.997 | 0.309 | 4 |
| 607 | 1 | 1 | 1 | 1 | 1 | 1 | 0.994 | 0.31 | 4 |
| 608 | 1 | 1 | 1 | 1 | 1 | 1 | 0.993 | 0.31 | 4 |
| 609 | 1 | 1 | 1 | 1 | 1 | 1 | 0.997 | 0.311 | 4 |
| 610 | 1 | 1 | 1 | 1 | 1 | 1 | 0.992 | 0.312 | 4 |
| 611 | 1 | 1 | 1 | 1 | 1 | 1 | 0.99 | 0.312 | 4 |
| 612 | 1 | 1 | 1 | 1 | 1 | 1 | 0.996 | 0.313 | 4 |
| 613 | 1 | 1 | 1 | 1 | 1 | 1 | 1.003 | 0.314 | 4 |
| 614 | 1 | 1 | 1 | 1 | 1 | 1 | 1.005 | 0.315 | 4 |
| 615 | 1 | 1 | 1 | 1 | 1 | 1 | 1.008 | 0.315 | 4 |
| 616 | 1 | 1 | 1 | 1 | 1 | 1 | 1.005 | 0.316 | 4 |
| 617 | 1 | 1 | 1 | 1 | 1 | 1 | 1.001 | 0.316 | 4 |
| 618 | 1 | 1 | 1 | 1 | 1 | 1 | 1 | 0.316 | 4 |
| 619 | 1 | 1 | 1 | 1 | 1 | 1 | 1.002 | 0.317 | 4 |
| 620 | 1 | 1 | 1 | 1 | 1 | 1 | 1.01 | 0.317 | 4 |
| 621 | 1 | 1 | 1 | 1 | 1 | 1 | 1.009 | 0.317 | 4 |
| 622 | 1 | 1 | 1 | 1 | 1 | 1 | 1.005 | 0.317 | 4 |
| 623 | 1 | 1 | 1 | 1 | 1 | 1 | 1 | 0.317 | 4 |
| 624 | 1 | 1 | 1 | 1 | 1 | 1 | 0.997 | 0.317 | 4 |
| 625 | 1 | 1 | 1 | 1 | 1 | 1 | 1 | 0.317 | 4 |
| 626 | 1 | 1 | 1 | 1 | 1 | 1 | 0.996 | 0.317 | 4 |
| 627 | 1 | 1 | 1 | 1 | 1 | 1 | 0.994 | 0.317 | 4 |
| 628 | 1 | 1 | 1 | 1 | 1 | 1 | 0.999 | 0.317 | 4 |
| 629 | 1 | 1 | 1 | 1 | 1 | 1 | 0.99 | 0.317 | 4 |
| 630 | 1 | 1 | 1 | 1 | 1 | 1 | 0.995 | 0.317 | 4 |
| 631 | 0 | 1 | 1 | 0.896 | 1 | 1 | 0.966 | 0.308 | 1 |
| 632 | 1 | 1 | 1 | 1 | 1 | 1 | 0.967 | 0.308 | 4 |
| 633 | 1 | 1 | 1 | 1 | 1 | 1 | 0.974 | 0.308 | 4 |
| 634 | 1 | 1 | 1 | 1 | 1 | 1 | 0.977 | 0.308 | 4 |
| 635 | 1 | 1 | 1 | 1 | 1 | 1 | 0.987 | 0.308 | 4 |
| 636 | 1 | 1 | 1 | 1 | 1 | 1 | 0.993 | 0.308 | 4 |
| 637 | 1 | 1 | 1 | 1 | 1 | 1 | 0.99 | 0.308 | 4 |
| 638 | 1 | 1 | 1 | 1 | 1 | 1 | 0.995 | 0.308 | 4 |
| 639 | 1 | 1 | 1 | 1 | 1 | 1 | 1.005 | 0.308 | 4 |
| 640 | 1 | 1 | 1 | 1 | 1 | 1 | 0.999 | 0.308 | 4 |
| 641 | 1 | 1 | 1 | 1 | 1 | 1 | 0.996 | 0.308 | 4 |
| 642 | 1 | 1 | 1 | 1 | 1 | 1 | 0.998 | 0.308 | 4 |
| 643 | 1 | 1 | 1 | 1 | 1 | 1 | 0.997 | 0.308 | 4 |
| 644 | 1 | 1 | 1 | 1 | 1 | 1 | 0.995 | 0.308 | 4 |
| 645 | 1 | 1 | 1 | 1 | 1 | 1 | 0.995 | 0.308 | 4 |
| 646 | 1 | 1 | 1 | 1 | 1 | 1 | 1.001 | 0.308 | 4 |
| 647 | 1 | 1 | 1 | 1 | 1 | 1 | 0.993 | 0.308 | 4 |
| 648 | 1 | 1 | 1 | 1 | 1 | 1 | 0.997 | 0.308 | 4 |
| 649 | 1 | 1 | 1 | 1 | 1 | 1 | 1.023 | 0.308 | 4 |
| 650 | 1 | 1 | 1 | 1 | 1 | 1 | 1.02 | 0.308 | 4 |
| 651 | 0 | 1 | 1 | 0.899 | 1 | 1 | 0.986 | 0.3 | 1 |
| 652 | 0 | 1 | 1 | 0.888 | 1 | 1 | 0.961 | 0.292 | 1 |
| 653 | 1 | 1 | 1 | 1 | 1 | 1 | 0.965 | 0.292 | 4 |
| 654 | 1 | 1 | 1 | 1 | 1 | 1 | 0.972 | 0.292 | 4 |
| 655 | 1 | 1 | 1 | 1 | 1 | 1 | 0.989 | 0.292 | 4 |
| 656 | 1 | 1 | 1 | 1 | 1 | 1 | 0.991 | 0.293 | 4 |
| 657 | 1 | 1 | 1 | 1 | 1 | 1 | 0.992 | 0.293 | 4 |
| 658 | 1 | 1 | 1 | 1 | 1 | 1 | 1.004 | 0.294 | 4 |
| 659 | 1 | 1 | 1 | 1 | 1 | 1 | 1.001 | 0.295 | 4 |
| 660 | 1 | 1 | 1 | 1 | 1 | 1 | 0.996 | 0.295 | 4 |
| 661 | 1 | 1 | 1 | 1 | 1 | 1 | 1.004 | 0.296 | 4 |
| 662 | 1 | 1 | 1 | 1 | 1 | 1 | 1.004 | 0.297 | 4 |
| 663 | 1 | 1 | 1 | 1 | 1 | 1 | 0.997 | 0.297 | 4 |
| 664 | 1 | 1 | 1 | 1 | 1 | 1 | 1.006 | 0.297 | 4 |
| 665 | 1 | 1 | 1 | 1 | 1 | 1 | 1.003 | 0.297 | 4 |
| 666 | 1 | 1 | 1 | 1 | 1 | 1 | 1.002 | 0.298 | 4 |
| 667 | 1 | 1 | 1 | 1 | 1 | 1 | 1.005 | 0.298 | 4 |
| 668 | 1 | 1 | 1 | 1 | 1 | 1 | 1.005 | 0.298 | 4 |
| 669 | 1 | 1 | 1 | 1 | 1 | 1 | 1 | 0.298 | 4 |
| 670 | 1 | 1 | 1 | 1 | 1 | 1 | 1.003 | 0.298 | 4 |
| 671 | 1 | 1 | 1 | 1 | 1 | 1 | 0.998 | 0.298 | 4 |
| 672 | 1 | 1 | 1 | 1 | 1 | 1 | 0.995 | 0.298 | 4 |
| 673 | 1 | 1 | 1 | 1 | 1 | 1 | 0.997 | 0.298 | 4 |
| 674 | 1 | 1 | 1 | 1 | 1 | 1 | 0.994 | 0.298 | 4 |
| 675 | 1 | 1 | 1 | 1 | 1 | 1 | 0.987 | 0.298 | 4 |
| 676 | 1 | 1 | 1 | 1 | 1 | 1 | 0.995 | 0.298 | 4 |
| 677 | 1 | 1 | 1 | 1 | 1 | 1 | 0.999 | 0.298 | 4 |

-continued

| DATA APPENDIX | | | | | | | | | |
|---|---|---|---|---|---|---|---|---|---|
| frame | sat_ok | high_ok | low_ok | kp_saturation | kp_high_bin | kp_low_bin | gain_control | setpoint_out | state |
| 678 | 1 | 1 | 1 | 1 | 1 | 1 | 0.988 | 0.298 | 4 |
| 679 | 1 | 1 | 1 | 1 | 1 | 1 | 1 | 0.298 | 4 |
| 680 | 1 | 1 | 1 | 1 | 1 | 1 | 1.002 | 0.298 | 4 |
| 681 | 1 | 1 | 1 | 1 | 1 | 1 | 0.998 | 0.298 | 4 |
| 682 | 1 | 1 | 1 | 1 | 1 | 1 | 0.981 | 0.299 | 4 |
| 683 | 1 | 1 | 1 | 1 | 1 | 1 | 1.019 | 0.303 | 4 |
| 684 | 1 | 1 | 1 | 1 | 1 | 1 | 1.029 | 0.308 | 4 |
| 685 | 1 | 1 | 1 | 1 | 1 | 1 | 1.022 | 0.308 | 4 |
| 686 | 1 | 1 | 1 | 1 | 1 | 1 | 1.023 | 0.308 | 4 |
| 687 | 1 | 1 | 1 | 1 | 1 | 1 | 1.014 | 0.308 | 4 |
| 688 | 1 | 1 | 1 | 1 | 1 | 1 | 1.002 | 0.308 | 4 |
| 689 | 1 | 1 | 1 | 1 | 1 | 1 | 1.004 | 0.308 | 4 |
| 690 | 1 | 1 | 1 | 1 | 1 | 1 | 1 | 0.308 | 4 |
| 691 | 1 | 1 | 1 | 1 | 1 | 1 | 0.999 | 0.308 | 4 |
| 692 | 1 | 1 | 1 | 1 | 1 | 1 | 1.008 | 0.308 | 4 |
| 693 | 1 | 1 | 1 | 1 | 1 | 1 | 1.001 | 0.308 | 4 |
| 694 | 1 | 1 | 1 | 1 | 1 | 1 | 0.991 | 0.308 | 4 |
| 695 | 1 | 1 | 1 | 1 | 1 | 1 | 1.003 | 0.308 | 4 |
| 696 | 1 | 1 | 1 | 1 | 1 | 1 | 1.002 | 0.308 | 4 |
| 697 | 1 | 1 | 1 | 1 | 1 | 1 | 1 | 0.308 | 4 |
| 698 | 1 | 1 | 1 | 1 | 1 | 1 | 1.002 | 0.308 | 4 |
| 699 | 1 | 1 | 1 | 1 | 1 | 1 | 0.998 | 0.308 | 4 |
| 700 | 1 | 1 | 1 | 1 | 1 | 1 | 0.995 | 0.308 | 4 |
| 701 | 1 | 1 | 1 | 1 | 1 | 1 | 1.001 | 0.308 | 4 |
| 702 | 1 | 1 | 1 | 1 | 1 | 1 | 1 | 0.308 | 4 |
| 703 | 1 | 1 | 1 | 1 | 1 | 1 | 0.995 | 0.308 | 4 |
| 704 | 1 | 1 | 1 | 1 | 1 | 1 | 1.003 | 0.308 | 4 |
| 705 | 1 | 1 | 1 | 1 | 1 | 1 | 1 | 0.308 | 4 |
| 706 | 1 | 1 | 1 | 1 | 1 | 1 | 1.003 | 0.308 | 4 |
| 707 | 1 | 1 | 1 | 1 | 1 | 1 | 1.005 | 0.308 | 4 |
| 708 | 1 | 1 | 1 | 1 | 1 | 1 | 1.002 | 0.308 | 4 |
| 709 | 1 | 1 | 1 | 1 | 1 | 1 | 0.999 | 0.308 | 4 |
| 710 | 1 | 1 | 1 | 1 | 1 | 1 | 1.001 | 0.308 | 4 |
| 711 | 1 | 1 | 1 | 1 | 1 | 1 | 1.01 | 0.308 | 4 |
| 712 | 1 | 1 | 1 | 1 | 1 | 1 | 1.001 | 0.308 | 4 |
| 713 | 0 | 1 | 1 | 0.899 | 1 | 1 | 0.97 | 0.3 | 1 |
| 714 | 1 | 1 | 1 | 1 | 1 | 1 | 0.979 | 0.3 | 4 |
| 715 | 1 | 1 | 1 | 1 | 1 | 1 | 0.978 | 0.3 | 4 |
| 716 | 1 | 1 | 1 | 1 | 1 | 1 | 0.982 | 0.3 | 4 |
| 717 | 1 | 1 | 1 | 1 | 1 | 1 | 0.991 | 0.3 | 4 |
| 718 | 1 | 1 | 1 | 1 | 1 | 1 | 0.992 | 0.3 | 4 |
| 719 | 1 | 1 | 1 | 1 | 1 | 1 | 0.997 | 0.3 | 4 |
| 720 | 1 | 1 | 1 | 1 | 1 | 1 | 1 | 0.3 | 4 |
| 721 | 1 | 1 | 1 | 1 | 1 | 1 | 0.993 | 0.3 | 4 |
| 722 | 1 | 1 | 1 | 1 | 1 | 1 | 0.999 | 0.3 | 4 |
| 723 | 1 | 1 | 1 | 1 | 1 | 1 | 1.004 | 0.3 | 4 |
| 724 | 1 | 1 | 1 | 1 | 1 | 1 | 1.005 | 0.3 | 4 |
| 725 | 1 | 1 | 1 | 1 | 1 | 1 | 1.005 | 0.3 | 4 |
| 726 | 1 | 1 | 1 | 1 | 1 | 1 | 1.001 | 0.3 | 4 |
| 727 | 1 | 1 | 1 | 1 | 1 | 1 | 1.001 | 0.3 | 4 |
| 728 | 1 | 1 | 1 | 1 | 1 | 1 | 1.004 | 0.3 | 4 |
| 729 | 1 | 1 | 1 | 1 | 1 | 1 | 1.004 | 0.301 | 4 |
| 730 | 1 | 1 | 1 | 1 | 1 | 1 | 1.002 | 0.301 | 4 |
| 731 | 1 | 1 | 1 | 1 | 1 | 1 | 1.001 | 0.301 | 4 |
| 732 | 1 | 1 | 1 | 1 | 1 | 1 | 1.004 | 0.301 | 4 |
| 733 | 1 | 1 | 1 | 1 | 1 | 1 | 1.004 | 0.301 | 4 |
| 734 | 1 | 1 | 1 | 1 | 1 | 1 | 1.003 | 0.301 | 4 |
| 735 | 1 | 1 | 1 | 1 | 1 | 1 | 1.011 | 0.301 | 4 |
| 736 | 1 | 1 | 1 | 1 | 1 | 1 | 1.011 | 0.302 | 4 |
| 737 | 1 | 1 | 1 | 1 | 1 | 1 | 1.007 | 0.302 | 4 |
| 738 | 1 | 1 | 1 | 1 | 1 | 1 | 1.003 | 0.302 | 4 |
| 739 | 1 | 1 | 1 | 1 | 1 | 1 | 1.006 | 0.303 | 4 |
| 740 | 1 | 1 | 1 | 1 | 1 | 1 | 1.007 | 0.304 | 4 |
| 741 | 1 | 1 | 1 | 1 | 1 | 1 | 1.01 | 0.304 | 4 |
| 742 | 1 | 1 | 1 | 1 | 1 | 1 | 1.013 | 0.304 | 4 |
| 743 | 1 | 1 | 1 | 1 | 1 | 1 | 1.011 | 0.305 | 4 |
| 744 | 1 | 1 | 1 | 1 | 1 | 1 | 1.011 | 0.305 | 4 |
| 745 | 1 | 1 | 1 | 1 | 1 | 1 | 1.011 | 0.306 | 4 |
| 746 | 1 | 1 | 1 | 1 | 1 | 1 | 1.012 | 0.307 | 4 |
| 747 | 1 | 1 | 1 | 1 | 1 | 1 | 1.01 | 0.307 | 4 |
| 748 | 1 | 1 | 1 | 1 | 1 | 1 | 1.015 | 0.307 | 4 |
| 749 | 1 | 1 | 1 | 1 | 1 | 1 | 1.007 | 0.307 | 4 |
| 750 | 1 | 1 | 1 | 1 | 1 | 1 | 1.013 | 0.307 | 4 |
| 751 | 1 | 1 | 1 | 1 | 1 | 1 | 1.015 | 0.307 | 4 |
| 752 | 1 | 1 | 1 | 1 | 1 | 1 | 1.013 | 0.307 | 4 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 753 | 1 | 1 | 1 | 1 | 1 | 1 | 1.012 | 0.307 | 4 |
| 754 | 1 | 1 | 1 | 1 | 1 | 1 | 1.012 | 0.307 | 4 |
| 755 | 1 | 1 | 1 | 1 | 1 | 1 | 1.004 | 0.307 | 4 |
| 756 | 1 | 1 | 1 | 1 | 1 | 1 | 1.007 | 0.307 | 4 |
| 757 | 1 | 1 | 1 | 1 | 1 | 1 | 1.014 | 0.307 | 4 |
| 758 | 0 | 1 | 1 | 0.885 | 1 | 1 | 0.983 | 0.298 | 1 |
| 759 | 1 | 1 | 1 | 1 | 1 | 1 | 0.981 | 0.298 | 4 |
| 760 | 1 | 1 | 1 | 1 | 1 | 1 | 0.995 | 0.298 | 4 |
| 761 | 1 | 1 | 1 | 1 | 1 | 1 | 1 | 0.298 | 4 |
| 762 | 1 | 1 | 1 | 1 | 1 | 1 | 0.999 | 0.298 | 4 |
| 763 | 1 | 1 | 1 | 1 | 1 | 1 | 1.002 | 0.298 | 4 |
| 764 | 1 | 1 | 1 | 1 | 1 | 1 | 1.004 | 0.298 | 4 |
| 765 | 1 | 1 | 1 | 1 | 1 | 1 | 1.002 | 0.298 | 4 |
| 766 | 1 | 1 | 1 | 1 | 1 | 1 | 1.011 | 0.298 | 4 |
| 767 | 1 | 1 | 1 | 1 | 1 | 1 | 1.004 | 0.298 | 4 |
| 768 | 1 | 1 | 1 | 1 | 1 | 1 | 1.005 | 0.298 | 4 |
| 769 | 1 | 1 | 1 | 1 | 1 | 1 | 1.009 | 0.298 | 4 |
| 770 | 1 | 1 | 1 | 1 | 1 | 1 | 1.016 | 0.298 | 4 |
| 771 | 1 | 1 | 1 | 1 | 1 | 1 | 1.008 | 0.298 | 4 |
| 772 | 1 | 1 | 1 | 1 | 1 | 1 | 1.014 | 0.298 | 4 |
| 773 | 0 | 1 | 1 | 0.892 | 1 | 1 | 0.983 | 0.29 | 1 |
| 774 | 0 | 1 | 1 | 0.885 | 1 | 1 | 0.958 | 0.282 | 1 |
| 775 | 1 | 1 | 1 | 1 | 1 | 1 | 0.967 | 0.282 | 4 |
| 776 | 1 | 1 | 1 | 1 | 1 | 1 | 0.975 | 0.282 | 4 |
| 777 | 1 | 1 | 1 | 1 | 1 | 1 | 0.981 | 0.283 | 4 |
| 778 | 1 | 1 | 1 | 1 | 1 | 1 | 0.994 | 0.283 | 4 |
| 779 | 1 | 1 | 1 | 1 | 1 | 1 | 0.999 | 0.283 | 4 |
| 780 | 1 | 1 | 1 | 1 | 1 | 1 | 1.002 | 0.284 | 4 |
| 781 | 1 | 1 | 1 | 1 | 1 | 1 | 1.002 | 0.285 | 4 |
| 782 | 1 | 1 | 1 | 1 | 1 | 1 | 1.011 | 0.285 | 4 |
| 783 | 1 | 1 | 1 | 1 | 1 | 1 | 1.009 | 0.286 | 4 |
| 784 | 1 | 1 | 1 | 1 | 1 | 1 | 1.012 | 0.287 | 4 |
| 785 | 1 | 1 | 1 | 1 | 1 | 1 | 1.011 | 0.287 | 4 |
| 786 | 1 | 1 | 1 | 1 | 1 | 1 | 1.013 | 0.288 | 4 |
| 787 | 1 | 1 | 1 | 1 | 1 | 1 | 1.012 | 0.288 | 4 |
| 788 | 1 | 1 | 1 | 1 | 1 | 1 | 1.022 | 0.288 | 4 |
| 789 | 1 | 1 | 1 | 1 | 1 | 1 | 1.019 | 0.288 | 4 |
| 790 | 1 | 1 | 1 | 1 | 1 | 1 | 1 | 0.288 | 4 |
| 791 | 1 | 1 | 1 | 1 | 1 | 1 | 1.006 | 0.288 | 4 |
| 792 | 1 | 1 | 1 | 1 | 1 | 1 | 1.005 | 0.288 | 4 |
| 793 | 1 | 1 | 1 | 1 | 1 | 1 | 0.992 | 0.288 | 4 |
| 794 | 1 | 1 | 1 | 1 | 1 | 1 | 1.014 | 0.288 | 4 |
| 795 | 1 | 1 | 1 | 1 | 1 | 1 | 1.026 | 0.288 | 4 |
| 796 | 1 | 1 | 1 | 1 | 1 | 1 | 1.013 | 0.288 | 4 |
| 797 | 1 | 1 | 1 | 1 | 1 | 1 | 1.016 | 0.288 | 4 |
| 798 | 1 | 1 | 1 | 1 | 1 | 1 | 1.012 | 0.288 | 4 |
| 799 | 1 | 1 | 1 | 1 | 1 | 1 | 1.009 | 0.288 | 4 |
| 800 | 0 | 1 | 1 | 0.892 | 1 | 1 | 0.986 | 0.28 | 1 |
| 801 | 0 | 1 | 1 | 0.879 | 1 | 1 | 0.961 | 0.273 | 1 |
| 802 | 1 | 1 | 1 | 1 | 1 | 1 | 0.968 | 0.273 | 4 |
| 803 | 1 | 1 | 1 | 1 | 1 | 1 | 0.979 | 0.273 | 4 |
| 804 | 1 | 1 | 1 | 1 | 1 | 1 | 0.995 | 0.273 | 4 |
| 805 | 1 | 1 | 1 | 1 | 1 | 1 | 0.996 | 0.273 | 4 |
| 806 | 1 | 1 | 1 | 1 | 1 | 1 | 1.004 | 0.274 | 4 |
| 807 | 1 | 1 | 1 | 1 | 1 | 1 | 1.015 | 0.275 | 4 |
| 808 | 1 | 1 | 1 | 1 | 1 | 1 | 1.002 | 0.275 | 4 |
| 809 | 1 | 1 | 1 | 1 | 1 | 1 | 1.006 | 0.276 | 4 |
| 810 | 1 | 1 | 1 | 1 | 1 | 1 | 1.01 | 0.276 | 4 |
| 811 | 1 | 1 | 1 | 1 | 1 | 1 | 1.01 | 0.277 | 4 |
| 812 | 1 | 1 | 1 | 1 | 1 | 1 | 1.005 | 0.277 | 4 |
| 813 | 1 | 1 | 1 | 1 | 1 | 1 | 1.011 | 0.278 | 4 |
| 814 | 1 | 1 | 1 | 1 | 1 | 1 | 1.007 | 0.278 | 4 |
| 815 | 1 | 1 | 1 | 1 | 1 | 1 | 1.01 | 0.278 | 4 |
| 816 | 1 | 1 | 1 | 1 | 1 | 1 | 1.016 | 0.278 | 4 |
| 817 | 1 | 1 | 1 | 1 | 1 | 1 | 1.016 | 0.278 | 4 |
| 818 | 1 | 1 | 1 | 1 | 1 | 1 | 1.009 | 0.278 | 4 |
| 819 | 1 | 1 | 1 | 1 | 1 | 1 | 1.013 | 0.278 | 4 |
| 820 | 1 | 1 | 1 | 1 | 1 | 1 | 1.01 | 0.278 | 4 |
| 821 | 1 | 1 | 1 | 1 | 1 | 1 | 1.009 | 0.278 | 4 |
| 822 | 1 | 1 | 1 | 1 | 1 | 1 | 1.021 | 0.278 | 4 |
| 823 | 1 | 1 | 1 | 1 | 1 | 1 | 1.015 | 0.278 | 4 |
| 824 | 1 | 1 | 1 | 1 | 1 | 1 | 1.008 | 0.278 | 4 |
| 825 | 1 | 1 | 1 | 1 | 1 | 1 | 1.006 | 0.278 | 4 |
| 826 | 1 | 1 | 1 | 1 | 1 | 1 | 1.004 | 0.278 | 4 |
| 827 | 1 | 1 | 1 | 1 | 1 | 1 | 1.002 | 0.278 | 4 |

-continued

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 828 | 1 | 1 | 1 | 1 | 1 | 1 | 1.001 | 0.278 | 4 |
| 829 | 1 | 1 | 1 | 1 | 1 | 1 | 1.006 | 0.278 | 4 |
| 830 | 1 | 1 | 1 | 1 | 1 | 1 | 1.002 | 0.278 | 4 |
| 831 | 0 | 1 | 1 | 0.899 | 1 | 1 | 0.985 | 0.27 | 1 |
| 832 | 1 | 1 | 1 | 1 | 1 | 1 | 0.981 | 0.27 | 4 |
| 833 | 1 | 1 | 1 | 1 | 1 | 1 | 0.993 | 0.271 | 4 |
| 834 | 1 | 1 | 1 | 1 | 1 | 1 | 1.008 | 0.271 | 4 |
| 835 | 1 | 1 | 1 | 1 | 1 | 1 | 1.008 | 0.271 | 4 |
| 836 | 1 | 1 | 1 | 1 | 1 | 1 | 1.004 | 0.272 | 4 |
| 837 | 1 | 1 | 1 | 1 | 1 | 1 | 1.014 | 0.272 | 4 |
| 838 | 1 | 1 | 1 | 1 | 1 | 1 | 1.012 | 0.272 | 4 |
| 839 | 1 | 1 | 1 | 1 | 1 | 1 | 1.005 | 0.272 | 4 |
| 840 | 1 | 1 | 1 | 1 | 1 | 1 | 1.016 | 0.272 | 4 |
| 841 | 1 | 1 | 1 | 1 | 1 | 1 | 1.019 | 0.272 | 4 |
| 842 | 1 | 1 | 1 | 1 | 1 | 1 | 1.015 | 0.272 | 4 |
| 843 | 1 | 1 | 1 | 1 | 1 | 1 | 1.014 | 0.272 | 4 |
| 844 | 1 | 1 | 1 | 1 | 1 | 1 | 1.01 | 0.272 | 4 |
| 845 | 1 | 1 | 1 | 1 | 1 | 1 | 1.015 | 0.272 | 4 |
| 846 | 1 | 1 | 1 | 1 | 1 | 1 | 1.007 | 0.272 | 4 |
| 847 | 1 | 1 | 1 | 1 | 1 | 1 | 1.009 | 0.272 | 4 |
| 848 | 1 | 1 | 1 | 1 | 1 | 1 | 1.004 | 0.272 | 4 |
| 849 | 1 | 1 | 1 | 1 | 1 | 1 | 1.012 | 0.272 | 4 |
| 850 | 1 | 1 | 1 | 1 | 1 | 1 | 1.027 | 0.273 | 4 |
| 851 | 1 | 1 | 1 | 1 | 1 | 1 | 1.031 | 0.274 | 4 |
| 852 | 1 | 1 | 1 | 1 | 1 | 1 | 1.017 | 0.274 | 4 |
| 853 | 1 | 1 | 1 | 1 | 1 | 1 | 1.032 | 0.274 | 4 |
| 854 | 1 | 1 | 1 | 1 | 1 | 1 | 1.008 | 0.274 | 4 |
| 855 | 1 | 1 | 1 | 1 | 1 | 1 | 1.01 | 0.274 | 4 |
| 856 | 1 | 1 | 1 | 1 | 1 | 1 | 1.006 | 0.274 | 4 |
| 857 | 1 | 1 | 1 | 1 | 1 | 1 | 1.005 | 0.274 | 4 |
| 858 | 1 | 1 | 1 | 1 | 1 | 1 | 0.999 | 0.274 | 4 |
| 859 | 1 | 1 | 1 | 1 | 1 | 1 | 1.004 | 0.275 | 4 |
| 860 | 1 | 1 | 1 | 1 | 1 | 1 | 1.002 | 0.275 | 4 |
| 861 | 1 | 1 | 1 | 1 | 1 | 1 | 0.991 | 0.275 | 4 |
| 862 | 1 | 1 | 1 | 1 | 1 | 1 | 1.01 | 0.276 | 4 |
| 863 | 1 | 1 | 1 | 1 | 1 | 1 | 1.011 | 0.277 | 4 |
| 864 | 1 | 1 | 1 | 1 | 1 | 1 | 1.011 | 0.278 | 4 |
| 865 | 1 | 1 | 1 | 1 | 1 | 1 | 1.026 | 0.279 | 4 |
| 866 | 1 | 1 | 1 | 1 | 1 | 1 | 1.019 | 0.28 | 4 |
| 867 | 1 | 1 | 1 | 1 | 1 | 1 | 1.017 | 0.281 | 4 |
| 868 | 1 | 1 | 1 | 1 | 1 | 1 | 1.024 | 0.282 | 4 |
| 869 | 1 | 1 | 1 | 1 | 1 | 1 | 1.017 | 0.283 | 4 |
| 870 | 1 | 1 | 1 | 1 | 1 | 1 | 1.012 | 0.285 | 4 |
| 871 | 1 | 1 | 1 | 1 | 1 | 1 | 1.029 | 0.286 | 4 |
| 872 | 1 | 1 | 1 | 1 | 1 | 1 | 1.041 | 0.287 | 4 |
| 873 | 1 | 1 | 1 | 1 | 1 | 1 | 1.026 | 0.288 | 4 |
| 874 | 1 | 1 | 1 | 1 | 1 | 1 | 1.037 | 0.289 | 4 |
| 875 | 1 | 1 | 1 | 1 | 1 | 1 | 1.03 | 0.289 | 4 |
| 876 | 1 | 1 | 1 | 1 | 1 | 1 | 1.009 | 0.289 | 4 |
| 877 | 1 | 1 | 1 | 1 | 1 | 1 | 1.002 | 0.289 | 4 |
| 878 | 1 | 1 | 1 | 1 | 1 | 1 | 1.016 | 0.29 | 4 |
| 879 | 1 | 1 | 1 | 1 | 1 | 1 | 1.009 | 0.29 | 4 |
| 880 | 1 | 1 | 1 | 1 | 1 | 1 | 1.011 | 0.29 | 4 |
| 881 | 1 | 1 | 1 | 1 | 1 | 1 | 1.022 | 0.29 | 4 |
| 882 | 1 | 1 | 1 | 1 | 1 | 1 | 1.018 | 0.29 | 4 |
| 883 | 1 | 1 | 1 | 1 | 1 | 1 | 1.005 | 0.29 | 4 |
| 884 | 1 | 1 | 1 | 1 | 1 | 1 | 1.002 | 0.29 | 4 |
| 885 | 1 | 1 | 1 | 1 | 1 | 1 | 0.99 | 0.291 | 4 |
| 886 | 1 | 1 | 1 | 1 | 1 | 1 | 0.989 | 0.291 | 4 |
| 887 | 1 | 1 | 1 | 1 | 1 | 1 | 1.003 | 0.292 | 4 |
| 888 | 1 | 1 | 1 | 1 | 1 | 1 | 0.994 | 0.292 | 4 |
| 889 | 1 | 1 | 1 | 1 | 1 | 1 | 0.994 | 0.293 | 4 |
| 890 | 1 | 1 | 1 | 1 | 1 | 1 | 1.006 | 0.294 | 4 |
| 891 | 1 | 1 | 1 | 1 | 1 | 1 | 1.001 | 0.295 | 4 |
| 892 | 1 | 1 | 1 | 1 | 1 | 1 | 0.991 | 0.296 | 4 |
| 893 | 1 | 1 | 1 | 1 | 1 | 1 | 1.01 | 0.297 | 4 |
| 894 | 1 | 1 | 1 | 1 | 1 | 1 | 1.001 | 0.299 | 4 |
| 895 | 1 | 1 | 1 | 1 | 1 | 1 | 1.004 | 0.3 | 4 |
| 896 | 1 | 1 | 1 | 1 | 1 | 1 | 0.999 | 0.301 | 4 |
| 897 | 1 | 1 | 1 | 1 | 1 | 1 | 0.997 | 0.302 | 4 |
| 898 | 1 | 1 | 1 | 1 | 1 | 1 | 0.995 | 0.303 | 4 |
| 899 | 1 | 1 | 1 | 1 | 1 | 1 | 1.004 | 0.304 | 4 |
| 900 | 1 | 1 | 1 | 1 | 1 | 1 | 1.01 | 0.306 | 4 |
| 901 | 1 | 1 | 1 | 1 | 1 | 1 | 1.002 | 0.307 | 4 |
| 902 | 1 | 1 | 1 | 1 | 1 | 1 | 1.007 | 0.308 | 4 |

DATA APPENDIX

| frame | sat_ok | high_ok | low_ok | kp_saturation | kp_high_bin | kp_low_bin | gain_control | setpoint_out | state |
|---|---|---|---|---|---|---|---|---|---|
| 903 | 1 | 1 | 1 | 1 | 1 | 1 | 1.006 | 0.309 | 4 |
| 904 | 1 | 1 | 1 | 1 | 1 | 1 | 1.009 | 0.311 | 4 |
| 905 | 1 | 1 | 1 | 1 | 1 | 1 | 1.012 | 0.312 | 4 |
| 906 | 1 | 1 | 1 | 1 | 1 | 1 | 1.022 | 0.313 | 4 |
| 907 | 1 | 1 | 1 | 1 | 1 | 1 | 1.008 | 0.314 | 4 |
| 908 | 1 | 1 | 1 | 1 | 1 | 1 | 0.986 | 0.316 | 4 |
| 909 | 1 | 1 | 1 | 1 | 1 | 1 | 1.015 | 0.317 | 4 |
| 910 | 1 | 1 | 1 | 1 | 1 | 1 | 1.014 | 0.319 | 4 |
| 911 | 1 | 1 | 1 | 1 | 1 | 1 | 1.012 | 0.321 | 4 |
| 912 | 1 | 1 | 1 | 1 | 1 | 1 | 1.01 | 0.322 | 4 |
| 913 | 1 | 1 | 1 | 1 | 1 | 1 | 1.008 | 0.324 | 4 |
| 914 | 1 | 1 | 1 | 1 | 1 | 1 | 1.009 | 0.325 | 4 |
| 915 | 1 | 1 | 1 | 1 | 1 | 1 | 1.014 | 0.327 | 4 |
| 916 | 1 | 1 | 1 | 1 | 1 | 1 | 0.999 | 0.328 | 4 |
| 917 | 1 | 1 | 1 | 1 | 1 | 1 | 1.002 | 0.33 | 4 |
| 918 | 1 | 1 | 1 | 1 | 1 | 1 | 1.009 | 0.332 | 4 |
| 919 | 1 | 1 | 1 | 1 | 1 | 1 | 1.002 | 0.333 | 4 |
| 920 | 1 | 1 | 1 | 1 | 1 | 1 | 1.009 | 0.335 | 4 |
| 921 | 1 | 1 | 1 | 1 | 1 | 1 | 1.02 | 0.337 | 4 |
| 922 | 1 | 1 | 1 | 1 | 1 | 1 | 1.015 | 0.338 | 4 |
| 923 | 1 | 1 | 1 | 1 | 1 | 1 | 1.009 | 0.34 | 4 |
| 924 | 1 | 1 | 1 | 1 | 1 | 1 | 1.011 | 0.341 | 4 |
| 925 | 1 | 1 | 1 | 1 | 1 | 1 | 1.014 | 0.343 | 4 |
| 926 | 1 | 1 | 1 | 1 | 1 | 1 | 1.008 | 0.344 | 4 |
| 927 | 1 | 1 | 1 | 1 | 1 | 1 | 1.009 | 0.346 | 4 |
| 928 | 1 | 1 | 1 | 1 | 1 | 1 | 1.012 | 0.347 | 4 |
| 929 | 1 | 1 | 1 | 1 | 1 | 1 | 1.012 | 0.349 | 4 |
| 930 | 1 | 1 | 1 | 1 | 1 | 1 | 1.007 | 0.351 | 4 |
| 931 | 1 | 1 | 1 | 1 | 1 | 1 | 1.01 | 0.352 | 4 |
| 932 | 1 | 1 | 1 | 1 | 1 | 1 | 1.01 | 0.354 | 4 |
| 933 | 1 | 1 | 1 | 1 | 1 | 1 | 1.017 | 0.356 | 4 |
| 934 | 1 | 1 | 1 | 1 | 1 | 1 | 1.013 | 0.358 | 4 |
| 935 | 1 | 1 | 1 | 1 | 1 | 1 | 1.01 | 0.36 | 4 |
| 936 | 1 | 1 | 1 | 1 | 1 | 1 | 1.021 | 0.361 | 4 |
| 937 | 1 | 1 | 1 | 1 | 1 | 1 | 1.018 | 0.363 | 4 |
| 938 | 1 | 1 | 1 | 1 | 1 | 1 | 1.017 | 0.365 | 4 |
| 939 | 1 | 1 | 1 | 1 | 1 | 1 | 1.016 | 0.366 | 4 |
| 940 | 1 | 1 | 1 | 1 | 1 | 1 | 1.017 | 0.368 | 4 |
| 941 | 1 | 1 | 1 | 1 | 1 | 1 | 1.013 | 0.369 | 4 |
| 942 | 1 | 1 | 1 | 1 | 1 | 1 | 1.008 | 0.37 | 4 |
| 943 | 1 | 1 | 1 | 1 | 1 | 1 | 1.015 | 0.371 | 4 |
| 944 | 1 | 1 | 1 | 1 | 1 | 1 | 0.989 | 0.372 | 4 |
| 945 | 1 | 1 | 1 | 1 | 1 | 1 | 0.996 | 0.374 | 4 |
| 946 | 1 | 1 | 1 | 1 | 1 | 1 | 0.995 | 0.375 | 4 |
| 947 | 1 | 1 | 1 | 1 | 1 | 1 | 1.015 | 0.376 | 4 |
| 948 | 1 | 1 | 1 | 1 | 1 | 1 | 1.005 | 0.377 | 4 |
| 949 | 1 | 1 | 1 | 1 | 1 | 1 | 1.004 | 0.378 | 4 |
| 950 | 1 | 1 | 1 | 1 | 1 | 1 | 0.995 | 0.379 | 4 |

I claim:

1. An image processing system for use with an image sensor and a power supply, the image processing system comprising:

correction circuitry coupled to the image sensor and configured to receive a raw frame of video data from the image sensor;

scene analysis circuitry
(1) coupled to the image sensor and configured to receive the raw frame of video data from the image sensor and
(2) coupled to the correction circuitry and configured to receive a processed frame of video data from the correction circuitry, wherein the scene analysis circuitry outputs
(1) an average video level of at least one of the raw frame of video data and the processed frame of video data and
(2) scene metrics related to at least one of the raw frame of video data and the processed frame of video data;

setpoint controller circuitry for outputting a setpoint based on at least the scene metrics;

and gain controller circuitry for receiving the average video level and the setpoint and setting a power supply gain as a function of a power supply gain for an earlier frame of video times the ratio of the setpoint to the average video level.

2. The image processing system as claimed in claim 1, wherein the image sensor is a sensor for night-vision goggles.

3. The image processing system as claimed in claim 1, wherein the scene metrics comprise at least one of the following characteristics:

a number of pixels that have intensities representing a saturated condition;

a percentage of pixels that have intensities representing the saturated condition;

a number of pixels that have intensities greater than a first threshold;

a percentage of pixels that have intensities greater than the first threshold;

a number of pixels that have intensities less than a second threshold;

and a percentage of pixels that have intensities less than the second threshold.

4. The image processing system as claimed in claim 1, wherein the setpoint controller circuitry sets the setpoint by assigning the reduction of saturation a higher priority than an adjustment based on any other scene metric of the scene metrics related to at least one of the raw frame of video data and the processed frame of video data.

5. The image processing system as claimed in claim 4, wherein the setpoint controller circuitry sets the setpoint by assigning the reduction of values in a high bin a higher priority than an adjustment based on any other scene metric, except for saturation, of the scene metrics related to at least one of the raw frame of video data and the processed frame of video data.

6. The image processing system as claimed in claim 1, wherein at least a portion of at least one of the correction circuitry, the scene analysis circuitry, the setpoint controller circuitry and the gain controller circuitry comprises a field programmable gate array (FPGA).

7. The image processing system as claimed in claim 1, wherein at least a portion of at least one of the correction circuitry, the scene analysis circuitry, the setpoint controller circuitry and the gain controller circuitry comprises a field programmable gate array (FPGA) connected to a microcontroller.

8. The image processing system as claimed in claim 7, wherein the field programmable gate array (FPGA) provides the scene metrics to the microcontroller, and wherein the microcontroller implements at least a portion of the setpoint controller circuitry and the gain controller circuitry.

9. A method of providing gain correction in an image processing system, the method being implemented under the control of a microcontroller reading computer instructions from a non-transitory computer memory accessible by the microcontroller and causing the system to perform the steps of:
(a) assigning a setpoint of a system gain controller;
(b) receiving a frame of digital video data;
(c) calculating plural scene metrics from the received frame of digital data, wherein the plural scene metrics include a saturation metric and a high bin metric, the saturation metric having a first threshold indicating a maximum amount of pixels at saturation, and the high bin metric having a second threshold indicating a maximum amount of pixels above a high bin threshold, wherein the first threshold is lower than the second threshold;
(d) calculating an adjustment metric based on the plural scene metrics;
(e) calculating a filter value based on the current setpoint of the system gain controller;
(f) calculating an updated setpoint based on the current setpoint of the system gain controller, the adjustment metric and the filter value; and
(g) repeating steps (b)-(f) for successive frames of digital video data.

10. The method as claimed in claim 9, wherein calculating the adjustment metric based on the plural scene metrics comprises calculating plural normalized scene metrics from the plural scene metrics.

11. The method as claimed in claim 10, wherein calculating the adjustment metric comprises calculating metric values based on the plural normalized scene metrics and a prioritization order for adjustments to the setpoint.

12. An image processing system for use with an image sensor and a power supply, the image processing system comprising:
correction circuitry coupled to the image sensor and configured to receive a raw frame of video data from the image sensor;
scene analysis circuitry
(1) coupled to the image sensor and configured to receive the raw frame of video data from the image sensor and
(2) coupled to the correction circuitry and configured to receive a processed frame of video data from the correction circuitry,
wherein the scene analysis circuitry outputs
(1) an average video level of at least one of the raw frame of video data and the processed frame of video data and
(2) scene metrics related to at least one of the raw frame of video data and the processed frame of video data;
setpoint controller circuitry for outputting a setpoint based on at least the scene metrics;
and gain controller circuitry for receiving the average video level and the setpoint and setting an image sensor gain as a function of an image sensor gain for an earlier frame of video times the ratio of the setpoint to the average video level.

13. The image processing system as claimed in claim 1, wherein the gain controller circuitry sets the power supply gain as a function of a power supply gain for an earlier frame of video, the ratio of the setpoint to the average video level, and an overshoot correction factor, alpha.

14. The image processing system as claimed in claim 12, wherein the gain controller circuitry sets the image sensor gain as a function of an image sensor gain for an earlier frame of video, the ratio of the setpoint to the average video level, and an overshoot correction factor, alpha.

15. The method as claimed in claim 9, wherein calculating the updated setpoint comprises constraining the updated setpoint to be within a range of a value for full white.

16. The method as claimed in claim 9, wherein calculating an adjustment metric based on the plural scene metrics comprises calculating an adjustment metric to decrease the setpoint when an amount of pixels at saturation is greater than the first threshold.

17. The method as claimed in claim 9, wherein calculating an adjustment metric based on the plural scene metrics comprises calculating an adjustment metric to decrease the setpoint when an amount of pixels above the high bin threshold is above the second threshold.

18. The method as claimed in claim 9, wherein calculating plural scene metrics from the received frame of digital data comprises calculating a low bin metric having a third threshold indicating a maximum amount of pixels below a low bin threshold.

19. The method as claimed in claim 18, wherein calculating an adjustment metric based on the plural scene metrics comprises calculating an adjustment metric to increase the setpoint when an amount of pixels below the low bin threshold is greater than the third threshold.

20. The image processing system as claimed in claim 12, wherein the image sensor is a sensor for night-vision goggles.

21. The image processing system as claimed in claim 12, wherein the scene metrics comprise at least one of the following characteristics:
a number of pixels that have intensities representing a saturated condition;
a percentage of pixels that have intensities representing the saturated condition;
a number of pixels that have intensities greater than a first threshold;
a percentage of pixels that have intensities greater than the first threshold;
a number of pixels that have intensities less than a second threshold;

and a percentage of pixels that have intensities less than the second threshold.

22. The image processing system as claimed in claim 12, wherein the setpoint controller circuitry sets the setpoint by assigning the reduction of saturation a higher priority than an adjustment based on any other scene metric of the scene metrics related to at least one of the raw frame of video data and the processed frame of video data.

23. The image processing system as claimed in claim 12, wherein the setpoint controller circuitry sets the setpoint by assigning the reduction of values in a high bin a higher priority than an adjustment based on any other scene metric, except for saturation, of the scene metrics related to at least one of the raw frame of video data and the processed frame of video data.

24. The image processing system as claimed in claim 12, wherein at least a portion of at least one of the correction circuitry, the scene analysis circuitry, the setpoint controller circuitry and the gain controller circuitry comprises a field programmable gate array (FPGA).

25. The image processing system as claimed in claim 12, wherein at least a portion of at least one of the correction circuitry, the scene analysis circuitry, the setpoint controller circuitry and the gain controller circuitry comprises a field programmable gate array (FPGA) connected to a microcontroller.

\* \* \* \* \*